(12) United States Patent  (10) Patent No.: US 8,408,720 B2
Nishigaki et al. (45) Date of Patent: Apr. 2, 2013

(54) IMAGE DISPLAY APPARATUS, IMAGE DISPLAY METHOD, AND RECORDING MEDIUM HAVING IMAGE DISPLAY PROGRAM STORED THEREIN

(75) Inventors: Hiroshi Nishigaki, Daito (JP); Atsuya Hirano, Daito (JP); Atsuhiko Chikaoka, Daito (JP); Ken Nishioka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 238 days.

(21) Appl. No.: 12/757,669

(22) Filed: Apr. 9, 2010

(65) Prior Publication Data

US 2011/0058109 A1 Mar. 10, 2011

(30) Foreign Application Priority Data

Apr. 10, 2009 (JP) .................................. 2009-095554

(51) Int. Cl.
*G03B 21/26* (2006.01)
*G03B 21/14* (2006.01)
*H04N 3/22* (2006.01)
*H04N 3/26* (2006.01)
*G06F 3/033* (2006.01)

(52) U.S. Cl. ................. 353/94; 353/82; 353/34; 353/28; 348/745; 345/179

(58) Field of Classification Search .................... 353/94, 353/82, 28, 122, 69, 70, 21, 34, 48, 49, 71; 348/745, 14.07; 345/179, 180
See application file for complete search history.

(56) References Cited

U.S. PATENT DOCUMENTS

| 5,085,506 A | * | 2/1992 | Kahn et al. | 353/122 |
| 5,568,279 A | * | 10/1996 | Hinman et al. | 358/452 |
| 2003/0218794 A1 | * | 11/2003 | Takeda et al. | 359/292 |
| 2004/0212783 A1 | * | 10/2004 | Wada | 353/31 |
| 2005/0012721 A1 | | 1/2005 | Fong et al. | |
| 2006/0221063 A1 | * | 10/2006 | Ishihara | 345/173 |

FOREIGN PATENT DOCUMENTS

| JP | 11-345087 | 12/1999 |
| JP | 2000-305706 | 11/2000 |
| JP | 2004-118807 | 4/2004 |
| JP | 2005-038422 | 2/2005 |
| JP | 2006-295779 | 10/2006 |
| JP | 2007-108570 | 4/2007 |
| JP | 2008-250482 | 10/2008 |

* cited by examiner

*Primary Examiner* — William C Dowling
*Assistant Examiner* — Ryan Howard
(74) *Attorney, Agent, or Firm* — Morgan, Lewis & Bockius LLP

(57) ABSTRACT

A projector divides and projects a single image onto two different projection surfaces and performs virtual user interface through one projection surface. The projector projects a VUI screen image on a desk and projects a main projected screen image on a wall. The projector includes a light receiving element, which is installed at a position that receives light emitted to the desk (the projection surface of the VUI screen image) and reflected (or scattered) by an object in the vicinity of the desk. The projector calculates a position of the object based on a light detection timing of the light-receiving element and a scanning position of light at each time and changes a projected image based on the calculated position. The projector displays a designated region of the VUI screen image to be brightened.

9 Claims, 13 Drawing Sheets

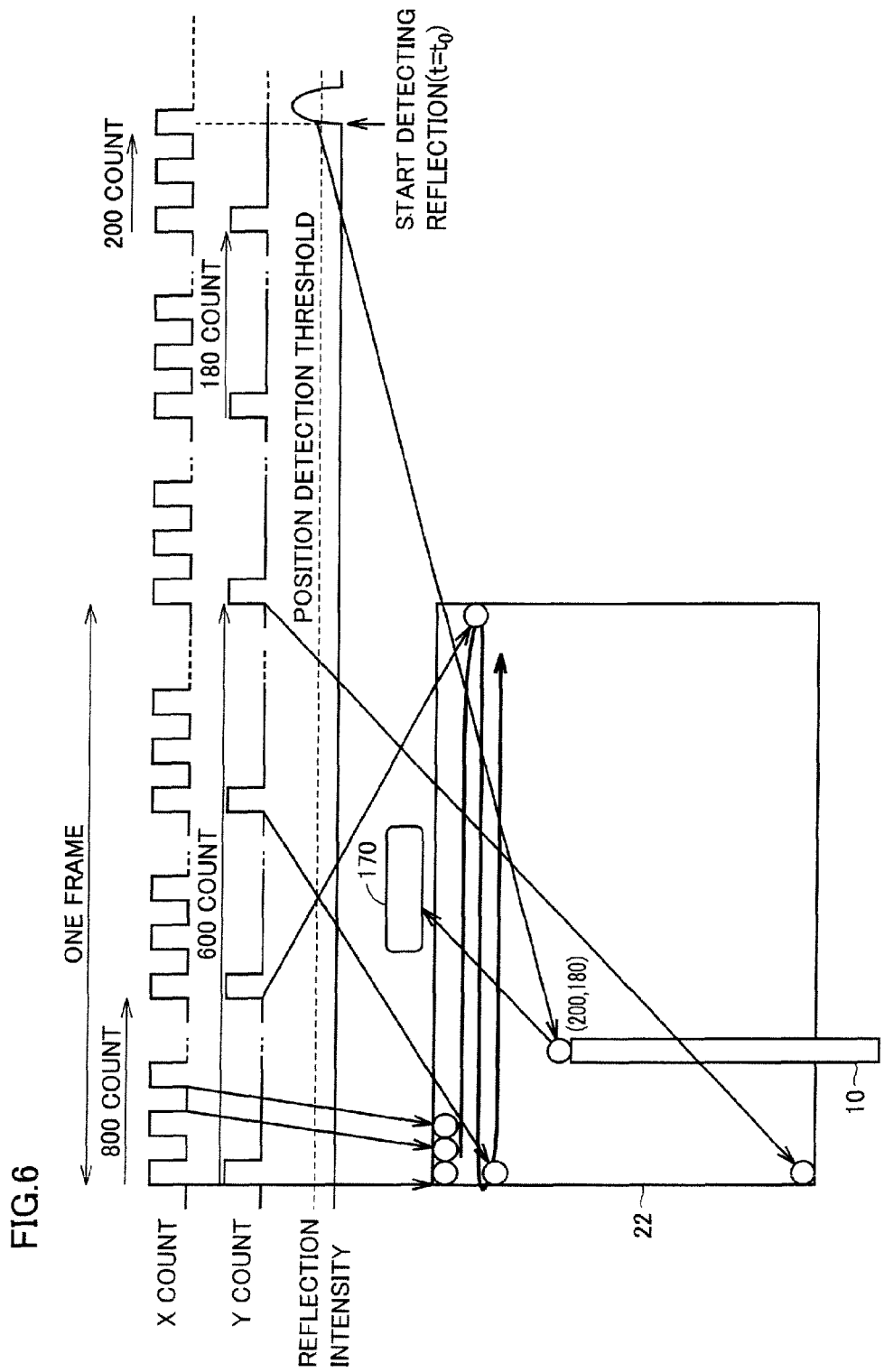

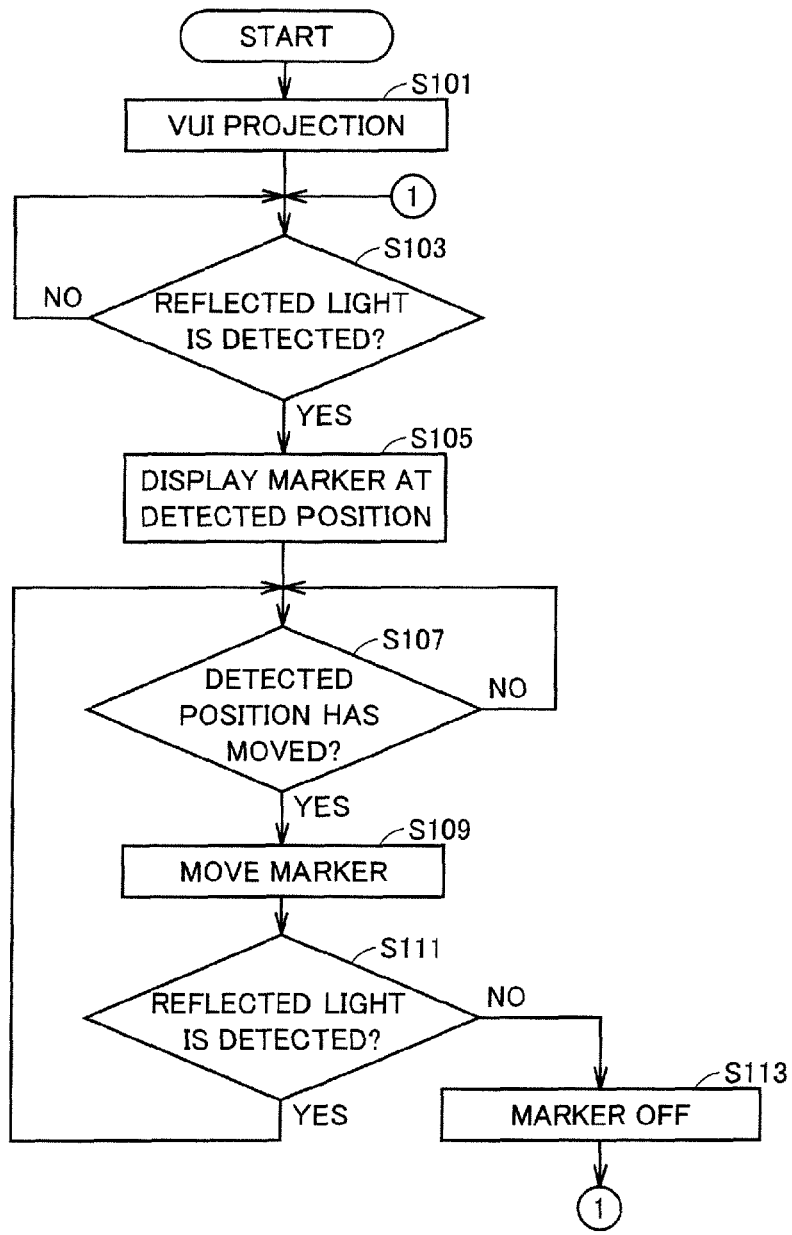

IMAGE DISPLAY APPARATUS, IMAGE DISPLAY METHOD, AND RECORDING MEDIUM HAVING IMAGE DISPLAY PROGRAM STORED THEREIN

BACKGROUND OF THE INVENTION

1. Field of the Invention

The present invention relates to an image display apparatus, an image display method, and a recording medium having an image display program stored therein for projecting images. In particular, the present invention relates to an image display apparatus, an image display method, and a recording medium having an image display program stored therein for projecting images by laser light.

2. Description of the Background Art

Projectors are now used in a variety of scenes to project images on projection surfaces such as screens or walls. In recent years, a wide variety of projectors have been developed.

Some projectors project an image in two different directions. For example, a projector disclosed in Japanese Patent Laying-Open No. 2005-038422 displays a virtual keyboard image on a first plane and displays a user output display image on a second plane. The lower part of the virtual keyboard image is superimposed on a keystroke detection system.

A data input device disclosed in Japanese Patent Laying-Open No. 2000-305706 detects an obstruction temporarily appearing in an input area at the outer side of the device body and determines a data entry. This data input device uses a laser diode and a diffraction optics to project an image of a virtual keyboard on the input area. The data input device uses infrared transmitter and receiver to detect a pointer or a finger on a virtual keyboard.

Portable information equipment disclosed in Japanese Patent Laying-Open No. 2006-295779 includes a first enclosure and a second enclosure connected to the first enclosure so as to be able to be opened and closed. The first enclosure has a projection-type input-displaying device showing a virtual keyboard in an input-displaying area, a projection-type display-displaying device showing character data or image data in a display-displaying area, and an input determination device detecting an obstruction appearing in the input-displaying area. The open/closed angle between the first enclosure and the second enclosure can be changed. The portable information equipment can set the input-displaying area and the display-displaying area at various positions by changing the open/closed angle.

A projector device disclosed in Japanese Patent Laying-Open No. 2007-108570 projects part of light projected from the projector device onto a sub-screen in the vicinity of the projector device. The sub-screen includes a screen and a touch panel superimposed on the screen. The projector device transmits a user operation on the sub-screen to a PC (Personal Computer) or the like.

Meanwhile, some projectors make it easier for the users of the projectors to point to points on projected images. A projector disclosed in Japanese Patent Laying-Open No. 2004-118807 includes a camera picking up an image of a screen. When the user points to a point on the screen by a laser pointer, the projector obtains the position pointed to by the pointer, based on the image by the camera. The projector re-projects a distinguishable mark on the position of the pointer.

Japanese Patent Laying-Open No. 2008-250482 discloses a mouse operation replacement system including a projector and an image pickup device capable of picking up an image of a finger that points to a part of a projected image by the projector. The projector sets a prescribed region including the part of the hand image picked up by the image pickup device, at proper brightness.

A presentation system disclosed in Japanese Patent Laying-Open No. 11-345087 includes a projector, a CCD (Charge Coupled Device) camera, and a processing unit. The CCD camera picks up an image of a display region of the image by the projector. The processing unit detects a pointing position from the shade or the real image of an object (for example, a pointer) included in the display region.

SUMMARY OF THE INVENTION

The projector realizing a Virtual User Interface (VUI) as disclosed in Japanese Patent Laying-Open Nos. 2005-038422 and 2000-305706 detects an object arranged in the virtual input region to determine the presence or absence of input and an input position.

Therefore, when the technique in Japanese Patent Laying-Open No. 2005-038422 is applied to a projector for performing presentation, the projector may not appropriately detect an input. The projector disclosed in Japanese Patent Laying-Open No. 2005-038422 uses a mirror system in the projector to divide a single keyboard image into a user input display and a user output display. In such a case, the virtual user interface screen image is identical with the projected screen image for presentation and therefore may include a part where luminance is low (black or the quantity of RGB light is small). The projector cannot detect an input into the low-luminance portion since it uses reflected light from an object to detect an input.

The present invention is made to solve the problems as described above. An object of the present invention is to provide an image display device capable of dividing and projecting a single image onto two different projection surfaces and appropriately performing virtual user interface through one projection surface.

An image display apparatus in accordance with an embodiment emits laser light, displays a first image on a first projection surface, and displays a second image on a second projection surface. The image display device includes: a laser light source for outputting the laser light; a scanner for scanning the laser light; a light splitting element for splitting the laser light scanned by the scanner into a first laser beam directed to the first projection surface and a second laser beam directed to the second projection surface; a photodetector for detecting the second laser beam reflected by an external object on the second projection surface; and a controller for controlling an operation of the image display apparatus. The controller is configured to allow the scanner to operate at a prescribed scanning frequency, to execute processing of accepting image data and increasing luminance of a pixel in a designated region included in the accepted image data, to control output of the laser light by the laser light source based on the image data subjected to the processing and the scanning frequency, to calculate a position of the external object based on a scanning position of the laser light at a light detection timing of the photodetector, and to create an instruction to change the second image based on the calculated position.

Preferably, the controller is configured to set the pixel in the designated region to white.

Preferably, the controller is configured to define a region including the calculated position as the designated region.

Preferably, the size of the designated region is larger than a distance of movement of the object in a time interval between changes of the second image.

Preferably, the controller is configured to calculate a predicted position of the object based on a change of the position and a time interval between changes of the second image and define a region including the predicted position as the designated region.

Preferably, the controller is configured to increase luminance of the pixel in a prescribed region when the position is not calculated.

Preferably, the controller is configured to create the instruction when the calculated position is in the designated region.

Preferably, the designated region is an icon display region or a region surrounding the icon display region.

An image display apparatus in accordance with another embodiment emits laser light, displays a first image on a first projection surface, and displays a second image on a second projection surface. The image display apparatus includes a laser light source for outputting the laser light. The laser light source includes a two-color laser for outputting red laser light and blue laser light, and a green laser for outputting green laser light. The image display apparatus further includes: a resonant MEMS (Micro-Electro Mechanical Systems) mirror for scanning the laser light; a beam splitter for splitting the laser light scanned by the resonant MEMS mirror into a first laser beam directed to the first projection surface and a second laser beam directed to the second projection surface; a photodiode for detecting the second laser beam reflected by an external object on the second projection surface; and a controller for controlling an operation of the image display apparatus. The controller is configured to allow the resonant MEMS mirror to operate at a prescribed scanning frequency and to execute processing of accepting image data and setting to white a pixel in a designated region included in the accepted image data, to control output of the laser light by the laser light source based on the image data subjected to the processing and the scanning frequency, to calculate a position of the external object based on a scanning position of the laser light at a light detection timing of the photodiode, to create an instruction to change the second image based on the calculated position, and to set a region including the calculated position as the designated region. The size of the designated region is larger than a distance of movement of the object in a time interval between changes of the second image.

An image display apparatus in accordance with another embodiment includes a laser light source for outputting laser light. The laser light source includes a two-color laser for outputting red laser light and blue laser light, and a green laser for outputting green laser light. The image display apparatus includes: a resonant MEMS mirror for scanning the laser light; a beam splitter for splitting the laser light scanned by the resonant MEMS mirror into a first laser beam directed to the first projection surface and a second laser beam directed to the second projection surface; a photodiode for detecting the second laser beam reflected by an external object on the second projection surface; and a controller for controlling an operation of the image display apparatus. The controller is configured to allow the resonant MEMS mirror to operate at a prescribed scanning frequency and to execute processing of accepting image data and setting to white a pixel in a designated region included in the accepted image data. The designated region is an icon display region or a region surrounding the icon display region. The controller is further configured to control output of the laser light by the laser light source based on the image data subjected to the processing and the scanning frequency, to calculate a position of the external object based on a scanning position of the laser light at a light detection timing of the photodiode, and to create an instruction to change the second image based on the calculated position. The controller is further configured to create the instruction when the calculated position is in the designated region.

In accordance with another embodiment, provided is a method for emitting laser light, displaying a first image on a first projection surface, and displaying a second image on a second projection surface, using an image display apparatus. The image display apparatus has a laser light source for outputting the laser light, a scanner for scanning the laser light, a light splitting element for splitting the laser light scanned by the scanner into a first laser beam directed to the first projection surface and a second laser beam directed to the second projection surface, and a photodetector for detecting the second laser beam reflected by an external object on the second projection surface. The method includes the steps of: executing processing of accepting image data and increasing luminance of a pixel in a designated region included in the accepted image data; allowing the scanner to operate at a prescribed scanning frequency and controlling output of the laser light by the laser light source based on the image data subjected to the processing and the scanning frequency; calculating a position of the external object based on a scanning position of the laser light at a light detection timing of the photodetector; and changing the second image based on the calculated position.

In accordance with another embodiment, provided is a recording medium having a program stored therein for allowing an image display apparatus to emit laser light, display a first image on a first projection surface, and display a second image on a second projection surface. The image display apparatus has a laser light source for outputting the laser light, a scanner for scanning the laser light, a light splitting element for splitting the laser light scanned by the scanner into a first laser beam directed to the first projection surface and a second laser beam directed to the second projection surface, and a photodetector for detecting the second laser beam reflected by an external object on the second projection surface. When the program is read out, the program causes a computer to execute the steps of: executing processing of increasing luminance of a pixel in a designated region included in image data applied to the computer; allowing the scanner to operate at a prescribed scanning frequency and controlling output of the laser light by the laser light source based on the image data subjected to the processing and the scanning frequency; calculating a position of the external object based on a scanning position of the laser light at a light detection timing of the photodetector; and changing the second image based on the calculated position.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating determination of a contact position based on a detection timing of scattering light.

FIG. 8 is a flowchart showing a flow of processing performed by the projector in accordance with the first embodiment.

DESCRIPTION OF THE PREFERRED EMBODIMENTS

Figure 1:
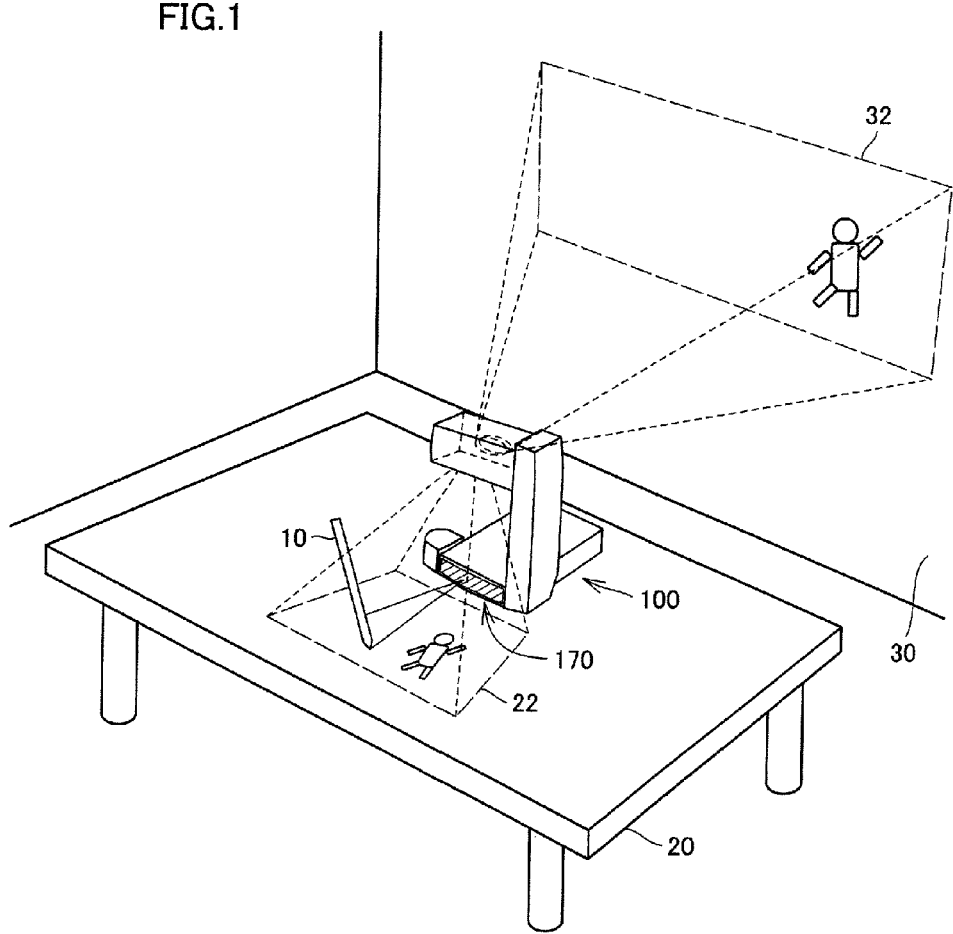
FIG. 1 is an illustration representing a usage manner of a projector in accordance with a first embodiment.

In the following, embodiments of the present invention will be described with reference to the figures. In the following description, the same parts are denoted with the same reference numerals. They have the same designations and functions. Therefore, a detailed description thereof will not be repeated.

[First Embodiment]

<Overview>

Referring to FIG. 1, a usage manner of a projector 100 in accordance with an embodiment of the present invention will be described.

In FIG. 1, projector 100 is used in such a manner to be arranged on a desk 20. Projector 100 projects a VUI (Virtual User Interface) screen image 22 in a first direction. Projector 100 also projects a main projected screen image 32 in a second direction different from the first direction.

Main projected screen image 32 is usually projected such that it can be viewed by many people. In FIG. 1, projector 100 projects main projected screen image 32 onto a wall 30. It is noted that wall 30 is an example of projection surfaces on which main projected screen 32 is projected. A screen or the like may be used in place of wall 30.

VUI screen image 22 is a screen image referred to by a user. VUI screen image 22 is usually projected in the vicinity of projector 100. In FIG. 1, projector 100 projects VUI screen image 22 on desk 20.

Projector 100 divides a single image into VUI screen image 22 and main projected screen image 32 by an optical element (not shown) in projector 100. Therefore, VUI screen image 22 and main projected screen image 32 are basically the same except for the magnification. Usually, projector 100 is designed such that the size of WI screen image 22 is smaller than the size of main projected screen image 32.

Projector 100 includes a light-receiving element 170 for detecting light. Light-receiving element 170 is installed at a position that receives light applied to desk 20 (the projection screen of VUI screen image 22) and reflected (or scattered) by an object 10 in the vicinity of desk 20. Although FIG. 1 depicts a pen as object 10, object 10 is not limited to a pen. For example, object 10 may be the user's finger. Preferably, object 10 scatters light from projector 100 so that light-receiving element 170 can detect light.

In the present embodiment, light-receiving element 170 is a photodiode. However, a CCD (Charge Coupled Device) sensor, a CMOS (Complementary Metal Oxide Semiconductor) sensor, or the like may be used in place of a photodiode.

Projector 100 calculates the position of object 10 based on a detection result of light-receiving element 170. Furthermore, projector 100 performs display control of both of VUI screen image 22 and main projected screen image 32 (these are collectively called a "projected screen image" hereinafter) based on the calculated position of object 10. The user can move a marker on the projected screen image or may change display contents of the projected screen image (for example, pages of display slides) by giving an instruction to VUI screen image 22 using object 10. The user can use VUI screen image 22 near the user to change main projected screen image 32 having the same contents as VUI screen image 22. This makes easier for the user to perform an intuitive operation on main projected screen image 32.

Here, the shape and size of projector 100 is not limited to the one shown in FIG. 1. Projector 100 may be a mobile projector having a potable size or may be a stationary projector.

<Hardware Configuration>

Figure 2:
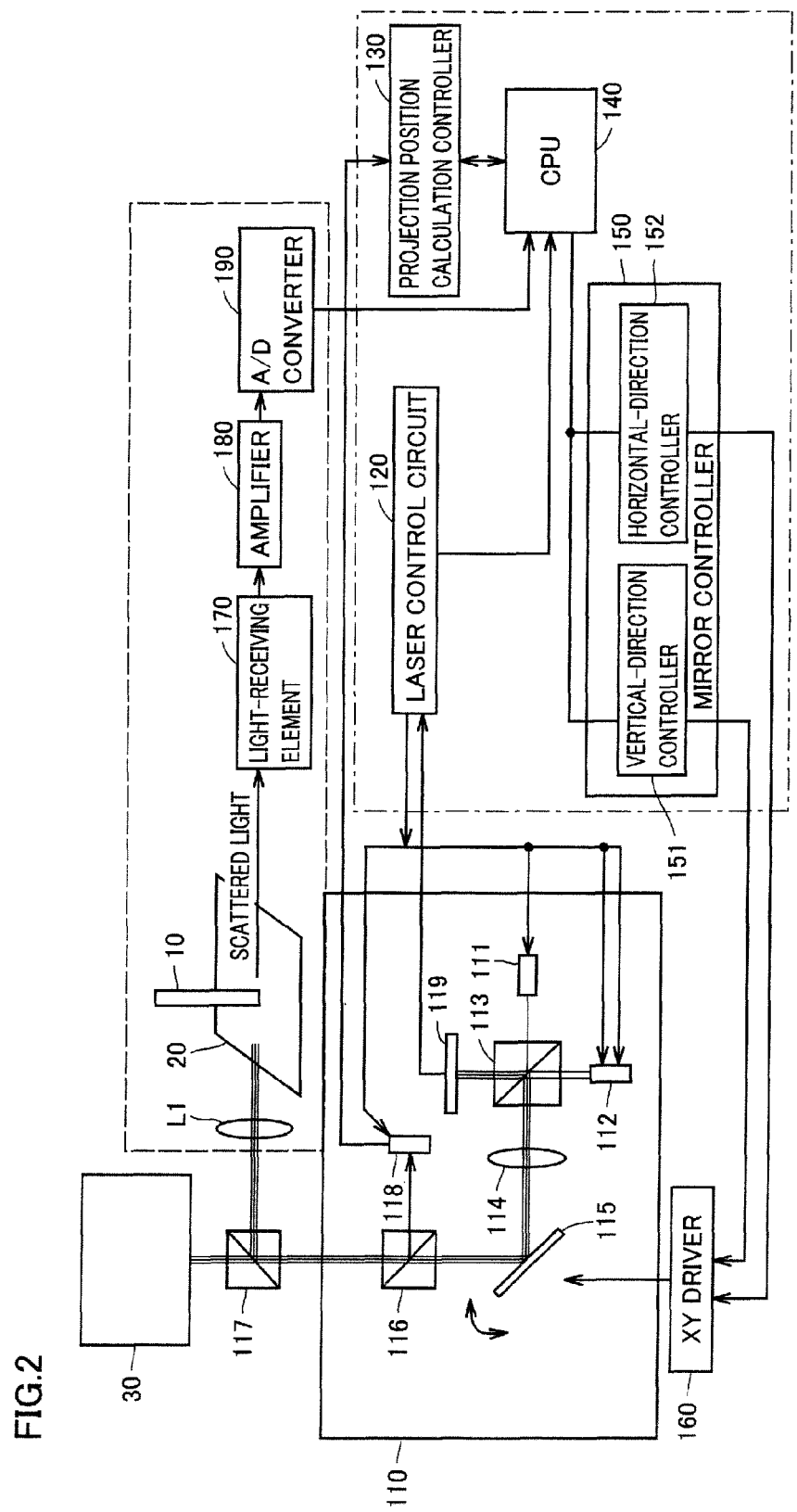
FIG. 2 is a diagram showing a main hardware configuration of the projector.

Referring to FIG. 2, a hardware configuration of projector 100 will be described.

Projector 100 is a so-called laser projector which displays an image on a projection surface by irradiating the projection surface with laser light. Projector 100 includes an optical system 110, a laser control circuit 120, a projection position calculation controller 130, a CPU (Central Processing Unit) 140, a mirror controller 150, an XY driver 160, light-receiving element 170, an amplifier 180, and an A/D converter 190.

Optical system 110 includes a green laser 111, a two-color laser 112, a first beam splitter 113, a collimator lens 114, a scan mirror 115, a second beam splitter 116, a third beam splitter 117, a lens L1, a photodetector 118, and a laser power detector 119.

Green laser 111 outputs green laser light. In a case where a laser capable of emitting green laser light is not available, a combination of a red laser outputting red laser light and an SHG (Second-Harmonic Generation) element may be used as green laser 111.

Two-color laser 112 outputs red laser light and blue laser light. A red laser chip emitting red laser light and a blue laser chip emitting blue laser light are incorporated in a package of two-color laser 112.

The use of two-color laser 112 achieves a reduction in number of components and miniaturization of optical system 110, as compared with the use of a red laser and a blue laser independent from each other. However, in a case where two-color laser 112 suitable for practical use cannot be prepared in terms of durability or prices, a red laser and a blue laser independent from each other may be used in place of two-color laser 112.

First beam splitter 113 superimposes the optical path of green laser light with the optical paths of red laser light and green laser light for output to collimator lens 114. First beam splitter 113 also outputs part of laser light of each color to laser power detector 119. The reflectance (or transmittance) of light of first beam splitter 113 is preferably set such that light is output to collimator lens 114 as much as possible in such an extent that laser power can be measured by laser power detector 119. First beam splitter 113 is an example of a combining element that combines optical paths of laser beams, and any other optical element may be used in place of first beam splitter 113.

Collimator lens 114 collects light passing through first beam splitter 113 to form a parallel beam.

Scan mirror 115 receives a driving signal to scan laser light and selectively applies light toward a projection surface for each pixel of a display target image. In the present embodiment, scan mirror 115 is a resonant MEMS (Micro Electro Mechanical Systems) mirror performing scanning in XY directions. Advantageously, the resonant MEMS mirror is small, consumes less power, and can be manufactured inexpensively. However, scan mirror 115 is not limited to the resonant MEMS mirror. For example, a resonant scanning mirror of any other type, a DMD (Digital Micromirror Device), a two-axis galvanometer mirror, or the like may be used as scan mirror 115.

In the present embodiment, scan mirror 115 two-dimensionally scans laser light. The two-axis type may be used as scan mirror 115. Alternatively, a combination of two one-axis scan mirrors may be used as scan mirror 115.

Scan mirror 115 scans laser light frame-by-frame of images. Scan mirror 115 changes scanning positions a number of times corresponding to the number of pixels of an image during one frame. Scan mirror 115 repeats a series of changes of scanning positions for each frame.

Second beam splitter 116 splits laser light scanned by scan mirror 115 into two laser beams traveling in different directions. One laser beam from second beam splitter 116 enters third beam splitter 117. The other laser beam from second beam splitter 116 enters photodetector 118.

Specifically, a laser beam passing through second beam splitter 116 enters third beam splitter 117. On the other hand, a laser beam reflected by second beam splitter 116 enters photodetector 118. Preferably, the reflectance of second beam splitter 116 is as low as possible in such an extent that reflected light can be detected by photodetector 118, so that light can be projected as much as possible on each projection surface. Here, the relation between the transmitted light and the reflected light as illustrated here may be reversed.

Third beam splitter 117 splits the laser beam from second beam splitter 116 into a laser beam directed to desk 20 (the projection surface for VUI screen image 22) and a laser beam directed to wall 30 (the projection surface for main projected screen image 32). In the present embodiment, third beam splitter 117 is a half mirror having a light transmittance of 50%. Therefore, main projected screen image 32 and VUI screen image 22 have almost the same brightness. However, the light transmittance of third beam splitter 117 is not limited to 50%.

Photodetector 118 detects light incident on a detection surface of photodetector 118. The detection results of photodetector 118 are used to detect the scan angle of scan mirror 115 (or a projection range of an image onto each projection surface). The detection results are also used to confirm the output timing of laser light for image projection.

Here, any other method may be used to detect the scan angle of scan mirror 115 or the output timing. For example, a detector for sensing a signal of scan mirror 115 itself may be used. For example, counterelectromotive force of an electromagnetic induction-type resonant MEMS mirror or a piezo signal of a capacitance-type resonant MEMS mirror may be sensed.

When photodetector 118 is used, photodetector 118 has to be arranged at the back of scan mirror 115 and therefore, the detection surface size of photodetector 118 has to be increased. However, in the method of sensing a signal of scan mirror 115 itself, photodetector 118 is not necessary and projector 100 can be reduced in size. In addition, this method can reduce the manufacturing costs of projector 100.

Even in the case where a detector for sensing a signal of scan mirror 115 itself is used, photodetector 118 may be provided at the same position and photodetector 118 may be used for APC (Auto Power Control). Here, the photodetector for APC may be arranged at a position at which light can be detected before entering scan mirror 115.

Laser power detector 119 measures the intensity of light from first beam splitter 113. The detection result of laser power detector 119 is used to control the intensity of laser beams output by green laser 111 and two-color laser 112.

It is noted that the configuration of optical system 110 is not limited to the above-noted one as long as optical system 110 includes a plurality of optical elements arranged such that scanned laser beams are projected on each projection surface.

Laser control circuit 120 controls green laser 111 and two-color laser 112 based on the detection result of laser power detector 119. Specifically, laser control circuit 120 controls driving current and the like of green laser 111 and two-color laser 112 such that green laser 111 and two-color laser 112 output laser light with the designated intensity at a prescribed timing.

Projection position calculation controller 130 detects a projection position (the traveling direction of light scanned by scan mirror 115) of a screen image, based on the detection result of photodetector 118. Specifically, projection position calculation controller 130 detects a projection position of a screen image based on a designated value of output timing of laser light and a detection timing of laser light by photodetector 118. The detected projection position is used to detect abnormal scan.

CPU 140 controls the operations of laser control circuit 120, projection position calculation controller 130, and mirror controller 150. For example, CPU 140 sends an image signal corresponding to a projected image to laser control circuit 120. In addition, CPU 140 applies the detection result (projection position) of projection position calculation controller 130 to mirror controller 150.

Mirror controller 150 creates a driving signal of XY driver 160. The driving signal designates a driving frequency and a driving waveform of scan mirror 150. Specifically, mirror controller 150 includes a vertical-direction controller 151 and a horizontal-direction controller 152. Vertical-direction controller 151 creates a driving signal for the Y direction. Horizontal-direction controller 152 creates a driving signal for the X direction.

In particular, mirror controller 150 changes a driving signal of XY driver 160 in accordance with a change of projection positions detected by photodetector 118. In other words, mirror controller 150 receives a signal according to the projection position from CPU 140 and generates a driving signal of XY driver 160 based on the received signal.

XY driver 160 allows scan mirror 115 to perform a scanning operation in accordance with the driving signal from mirror controller 150. Specifically, XY driver 160 generates current having a waveform corresponding to the driving signal for scan mirror 115 (resonant MEMS mirror) and applies the generated current to scan mirror 115.

More specifically, XY driver 160 generates a pulse rectangular wave for horizontal driving (high-speed driving) and a DC waveform for vertical driving, based on an instruction to control a driving frequency or an instruction to generate or switch a waveform pattern from mirror controller 150.

For the horizontal direction, XY driver 160 resonantly drives scan mirror 115 by a rectangular wave. The resonant driving enables scan mirror 115 to move at high speed with less current. XY driver 160 drives scan mirror 115 with a pulse in accordance with the resonance frequency unique to scan mirror 115.

For the vertical direction, XY driver 160 DC-drives scan mirror 115 at low speed. The low-speed DC driving can control the position of scan mirror 115 at a desired position by current. A vertical driving waveform is the repeated current pattern of gradually decreasing (or increasing) with time during a projection period of a frame of a projected image. The vertical driving frequency defines the frame rate.

The resolution in the horizontal direction of projector 100 is determined by the number of times the laser outputs laser light during one horizontal scan period. Therefore, the resolution in the horizontal direction of projector 100 depends on the resonance frequency of scan mirror 115 and the output frequency of the laser.

On the other hand, the resolution in the vertical direction of projector 100 is determined by a vertical driving waveform. Specifically, the time ratio of the waveform of a projection direction (forward path or backward path of scan) in one cycle of the vertical driving waveform is set such that scan mirror 115 can scan lines corresponding to the resolution in the vertical direction during one round trip in the vertical direction.

The resolution of projector 100 also depends on a scanning mode. Specifically, the resolution of projector 100 varies depending on whether the scanning mode is a progressive mode or an interface mode.

The scanning mode is determined by the output period of laser light and the relation between the forward path and return path periods of scan. In the present invention, scan mirror 115 scans light from the top to the bottom of a frame. In other words, the laser outputs laser light in a forward path period. However, the scanning direction is not limited thereto. For example, if the laser outputs laser light in a return path period, the scanning direction is reversed (from the bottom to the top). Furthermore, if the laser outputs laser light both in a forward path period and a return path period, light is scanned in both directions.

It is noted that a low-speed (vertical direction) mirror also has a resonance frequency. Therefore, mirror controller 151 analogically and digitally removes harmonic components of driving frequency in the vertical direction such that the harmonic components do not overlap the resonance frequency. XY driver 160 may perform such a filtering process.

Light-receiving element 170 detects light incident on light-receiving element 170 and outputs a detection signal according to the detection of light to amplifier 180. As described above, light-receiving element 170 detects scattered light by object 10 on desk 20.

Amplifier 180 amplifies the detection signal from light-receiving element 170 and outputs the amplified detection signal to A/D converter 190. A/D converter 190 converts the signal from amplifier 180 into a digital signal and applies the digital signal to CPU 140.

Figure 3:
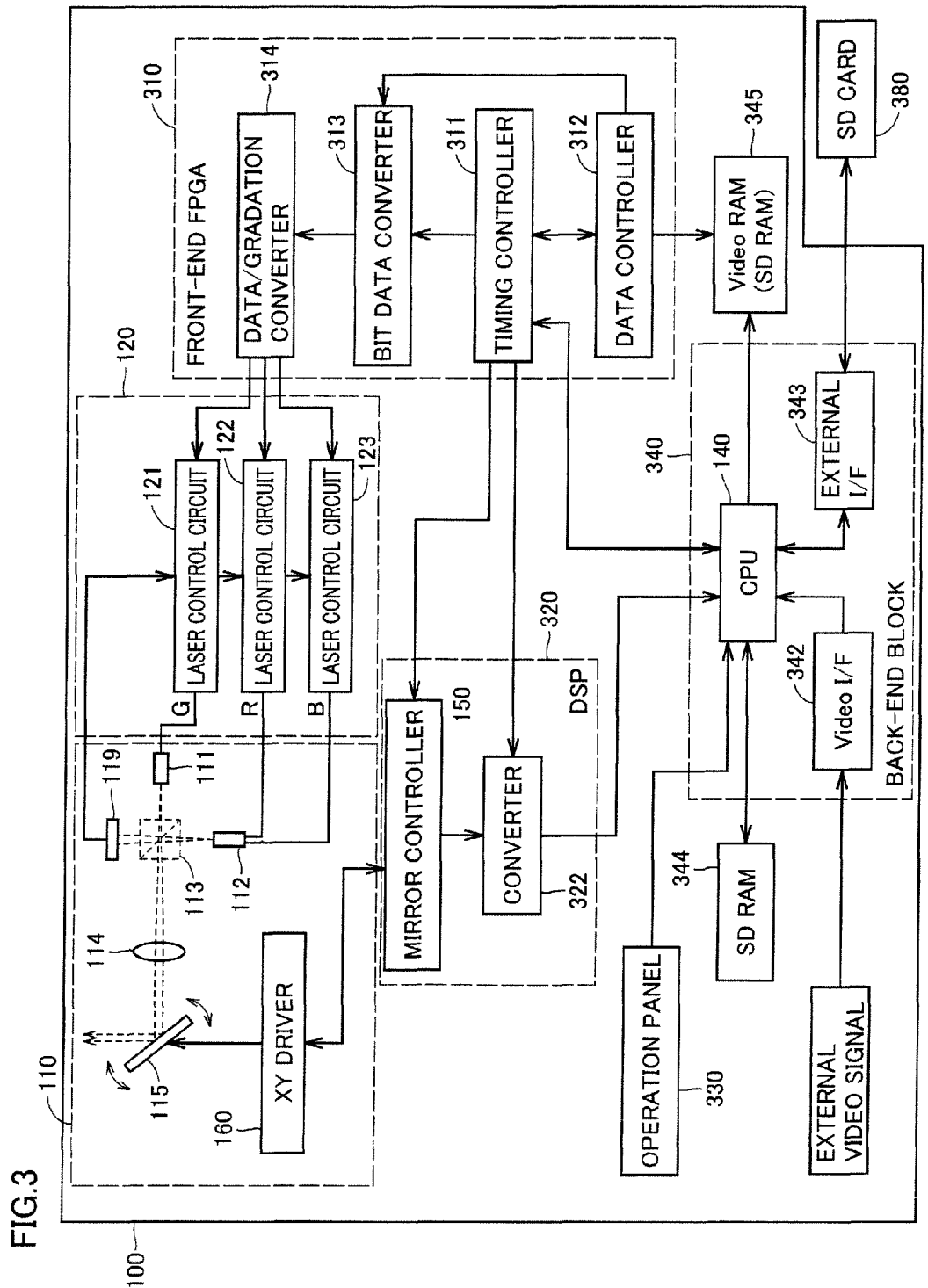
FIG. 3 is a diagram illustrating the hardware configuration of the projector in more detail.

Referring to FIG. 3, the configuration of projector 100 will be described in more detail. It is noted that the description of some (light-receiving element 170, amplifier 180, and the like) of the configuration that have been shown in FIG. 2 will not be repeated in FIG. 3.

Projector 100 includes optical system 110, laser control circuit 120, a front-end FPGA (Field Programmable Gate Array) 310, a digital signal processor 320, an operation panel 330, a back-end block 340, an SDRAM (Synchronous Dynamic Random Access Memory) 344, and a video RAM (Random Access Memory) 345.

Operation panel 330 is provided on a front surface or a side surface of the casing of projector 100. Operation panel 330 includes, for example, a display device (not shown) displaying operation contents and a switch (for example, plus/minus buttons) accepting an operation input to projector 100. When accepting an operation, operation panel 330 sends a signal according to the accepted operation to CPU 140 included in back-end block 340.

Back-end block 340 includes CPU 140, a video interface 342, and an external interface 343.

Video interface 342 accepts an image signal (external video signal) applied from the outside of projector 100. A personal computer or the like is connected to video interface 342.

External interface 343 accepts attachment of an SD card 380. External interface 343 reads out data from SD card 380. CPU 140 stores the read data into SDRAM 344 or video RAM 345. External interface 343 may handle a recording medium other than SD card 380.

CPU 140 controls projection of an image based on a signal input to projector 100 through video interface 342 or external interface 343 in accordance with an operation input applied to operation panel 330. More specifically, CPU 140 stores image data based on the input signal into video RAM 345. CPU 140 controls a timing controller 311 in front-end FPGA 310 to control projection of an image based on the image data in video RAM 345.

Front-end FPGA 310 includes a data/gradation converter 314, timing controller 311, a data controller 312, and a bit data converter 313.

Timing controller 311 reads image data held in video RAM 345 through data controller 312 based on a command sent from CPU 140. In addition, timing controller 311 performs control of digital signal processor 320.

Data controller 312 sends image data read from video RAM 345 to bit data converter 313.

Bit data converter 313 converts image data into data in a format suitable for projection by laser emission, based on an instruction from timing controller 311. Furthermore, the image data having the format converted is sent to data/gradation converter 314.

Data/gradation converter 314 converts data output from bit data converter 313 into color gradation data for display in three colors of G (Green), R (Red), B (Blue). Data/gradation converter 314 sends the converted data to laser control circuit 120.

Laser control circuit 120 includes a green laser control circuit 121, a red laser control circuit 122, and a blue laser control circuit 123, though not shown in detail in FIG. 1. Green laser control circuit 121 controls the output timing and intensity of laser light output by green laser 111, based on G gradation data. Specifically, for example, green laser control circuit 121 adjusts driving current applied to green laser 111 to adjust the intensity of green laser light. Red laser control circuit 122 and blue laser control circuit 123 also operate similarly to green laser control circuit 121.

Digital signal processor 320 includes mirror controller 150 and a converter 322.

Mirror controller 150 controls the operation of scan mirror 115 based on an instruction from timing controller 311. Specifically, mirror controller 150 generates a driving signal for driving XY driver 160, based on an instruction. XY driver 160 scans laser light by changing the position and the inclination of scan mirror 115, based on the driving signal.

Converter 322 transmits a signal sent from mirror controller 150 to CPU 140. For example, converter 322 generates a signal including a driving signal to XY driver 160 and a state of XY driver 160 and sends the generated signal to CPU 140. CPU 140 determines whether a scan abnormality occurs or not based on this signal, and stops projection of an image if any abnormality is found in scanning.

<Functional Configuration>

Figure 4:
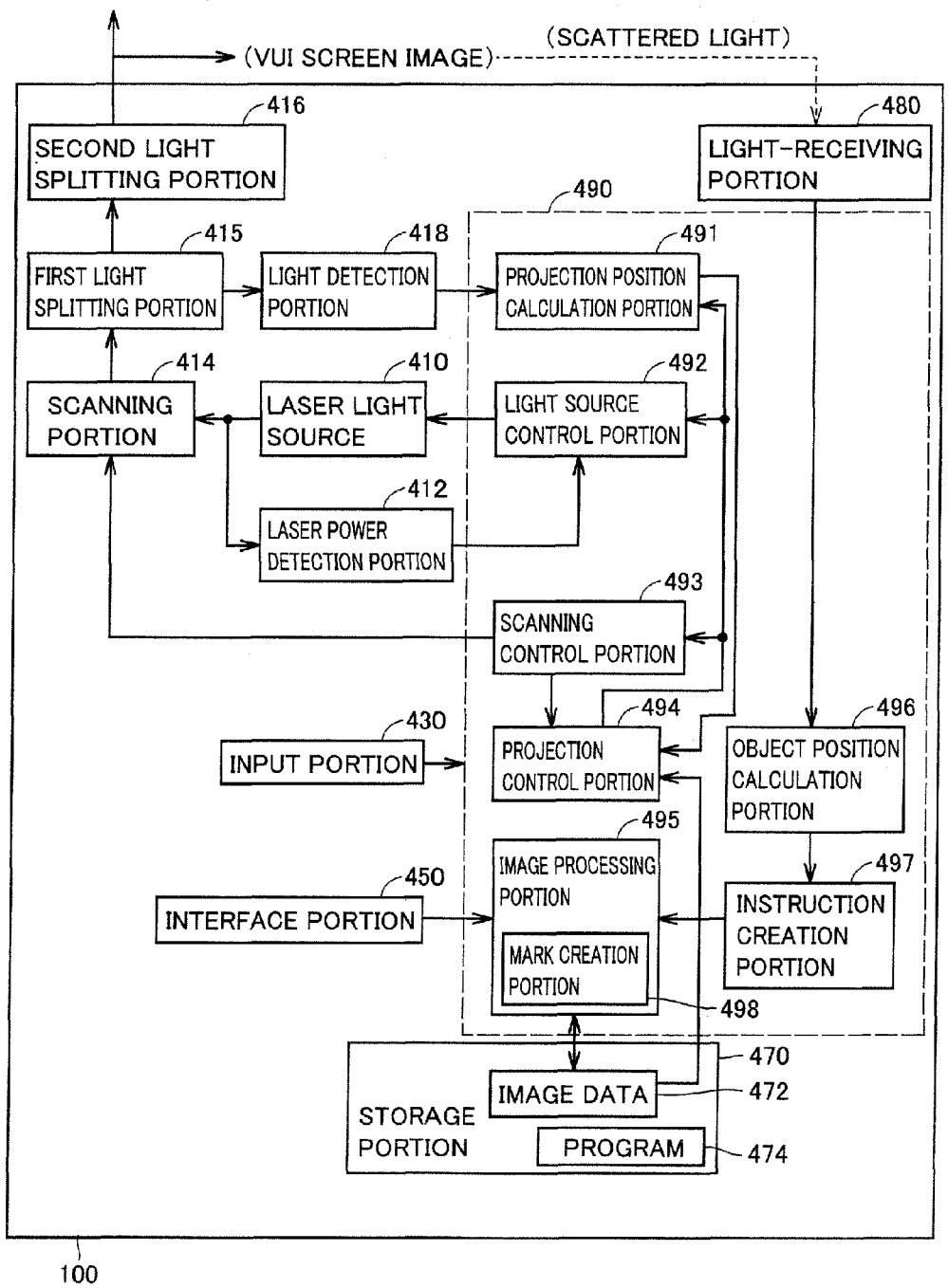
FIG. 4 is a diagram showing a functional configuration of the projector.

Referring to FIG. 4, a functional configuration of projector 100 will be described.

Referring to FIG. 4, projector 100 includes a laser light source 410, a laser power detection portion 412, a scanning portion 414, a first light splitting portion 415, a second light splitting portion 416, a light detection portion 418, an input portion 430, an interface portion 450, a storage portion 470, a light-receiving portion 480, and a control portion 490.

Laser light source 410 outputs laser light. In the present embodiment, laser light source 410 outputs laser light of three colors, RGB. Green laser 111, two-color laser 112, and first beam splitter 113 correspond to laser light source 410.

Laser power detection portion 412 detects the intensity of laser light output from laser light source 410. First beam splitter 113 and laser power detector 119 correspond to laser power detection portion 412.

Scanning portion 414 scans laser light output from laser light source 410. Scan mirror 115 and XY driver 160 correspond to scanning portion 414.

First light splitting portion 415 splits the scanned laser light into a laser beam directed to light detection portion 418 and a laser beam directed to second light splitting portion 416. Second beam splitter 116 corresponds to first light splitting portion 415.

Second light splitting portion 416 splits laser light from first light splitting portion 416 into a laser beam directed to a projection surface (wall 30) of the main projected screen image and a laser beam directed to a projection surface (desk 20) of the VUI screen image. Third beam splitter 117 corresponds to second light splitting portion 416.

Light detection portion 418 detects part of the scanned laser light. The detection result of light detection portion 418 is used to calculate the scanning position. Photodetector 118 corresponds to light detection portion 418.

Input portion 430 accepts an instruction to projector 100 from the outside. Furthermore, input portion 430 sends the accepted instruction to control portion 490. Operation panel 330 corresponds to input portion 430. Although projector 100 regards an input to the VUI screen image as an instruction as well, input portion 430 here does not include a part concerning an input to the VUI screen image.

Interface portion 450 exchanges data with the outside. Video interface 342 and external interface 343 correspond to interface portion 450.

Storage portion 470 stores data. Specifically, storage portion 470 stores image data 472 and a program 474. However, data stored by storage portion 470 is not limited thereto. SDRAM 344 and video RAM 345 correspond to storage portion 470.

Image data 472 is data that serves as a basis of a projected image projected by projector 100. In the present embodiment, image data 472 is formed by control portion 490 performing prescribed image processing on data read by projector 100 from an external storage device or an external video signal.

Program 474 is a program for performing image processing on image data 472.

Light-receiving portion 480 detects scattered light by object 10 on desk 20. Light-receiving element 170 corresponds to light-receiving portion 480.

Control portion 490 controls the operations of storage portion 470, laser light source 410 and scanning portion 414, based on the detection result of laser power detection portion 412, the detection result of light detection portion 418, the detection result of light-receiving portion 480, and the instruction accepted by input portion 430. Control portion 490 includes a projection position calculation portion 491, a light source control portion 492, a scanning control portion 493, a projection control portion 494, an image processing portion 495, an object position calculation portion 496, and an instruction creation portion 497.

Projection position calculation portion 491 calculates a projection position based on the detection result of light detection portion 418. Projection position calculation portion 491 sends the calculated projection position to projection control portion 494. Projection position calculation controller 130 corresponds to projection position calculation portion 491.

Light source control portion 492 controls output of laser light by laser light source 410, based on the detection result of laser power detection portion 412 and a signal from projection control portion 494. Specifically, light source control portion 492 controls the output timing and the intensity of laser light of each color. Laser control circuit 120 corresponds to light source control portion 492.

Scanning control portion 493 controls the operation of scanning portion 414 based on a signal from projection control portion 494. Scanning control portion 493 allows scanning portion 414 to operate at a prescribed scanning frequency. Furthermore, scanning control portion 493 sends a signal including an operation state of scanning portion 414 to projection control portion 493. Digital signal processor 320 corresponds to scanning control portion 493.

Projection control portion 494 controls the operations of light source control portion 492 and scanning control portion 493 for projection of images. CPU 140, timing controller 311, and data controller 312 correspond to projection control portion 494.

Specifically, projection control portion 494 reads out image data 472 from storage portion 470. Then, projection control portion 494 generates a control signal to be applied to light source control portion 492, based on the read image data 472 and a designated value of scanning frequency of scan mirror 115. Projection control portion 494 sends the generated control signal to light source control portion 492.

Furthermore, projection control portion 494 gives an instruction to start or end scanning to scanning control portion 493, in accordance with the designated scanning period and an operation state of scanning portion 414.

Image processing portion 495 stores image data accepted by interface portion 450 into storage portion 470. In addition, image processing portion 495 executes program 474 to perform prescribed processing on image data 472, based on an instruction accepted by input portion 430 or an instruction generated by instruction creation portion 497 (as described later) in accordance with input to VUI screen image 22.

For example, image processing portion 495 performs size change processing or rotation processing on image data 472 stored in storage portion 470 and stores the processed data into storage portion 470.

When image data 472 includes plural pieces of image page data, image processing portion 495 determines image page data for projection, from image data 472. Image processing portion 495 selects page data for projection, based on an instruction accepted by input portion 430 from the outside or an instruction generated by instruction creation portion 497.

Image creation portion 495 includes a mark creation portion 498. Mark creation portion 498 stores in storage portion 470 data obtained by adding to image data 472 display data corresponding to a marker corresponding to the input position onto VUI screen image 22, based on an instruction accepted from instruction creation portion 497.

Object position calculation portion 496 calculates the designated position by object 10 onto the VUI screen image, based on the detection result by light-receiving portion 480, that is, the detection result of scattered light by object 10. The calculation of designated position based on the detection result of light-receiving portion 480 will be detailed later.

Instruction creation portion 497 generates an instruction for changing a projected image, based on the designated position calculated by object position calculation portion 496. Specifically, instruction creation portion 497 generates an instruction to execute image processing for image processing portion 495. For example, instruction creation portion 497 gives image processing portion 495 an instruction for changing the luminance of that region of image data 472 which includes the position of object 10, together with the position data of object 10. When image data 472 includes plural pieces of page data, instruction creation portion 497 may send an instruction to change a page for projection to image processing portion 495.

The functions of control portion 490 as described above are realized by projection position calculation controller 130, CPU 140 executing program 474, front-end FPGA 310, digital signal processor 320, and laser control circuit 120. However, the configuration that realizes the functions of control portion 490 is not limited to the one described above. Part or all of the functions of control portion 490 may be realized by hardware such as dedicated circuitry or may be realized by a processor executing a program using RAM as a working memory.

<Position Calculation Method of External Object>

In the following, with reference to FIG. 5, a process of specifying a position of object 10 on VUI screen image 22 will be described in detail.

Projector 100 projects VUI screen image 22 on desk 20 through lens L1. Projector 100 selectively outputs laser light pixel-by-pixel of a projected image. More specifically, projector 100 outputs laser light having a color and intensity corresponding to a pixel, for each of a plurality of durations (referred to as scanning steps). Projector 100 scans laser light and outputs laser light in a direction corresponding to a pixel in each scanning step. FIG. 5 shows an optical path A in a case where light output by projector 100 in a scanning step travels in a straight line without being reflected by object 10 or desk 20.

When object 10 is placed on VUI screen image 22, laser light from projector 100 toward VUI screen image 22 is scattered by object 10. The scattered laser light changes its optical path and enters light-receiving element 170 FIG. 5 shows an optical path B of light which travels through optical path A and is scattered by object 10. It is noted that optical path B is shown with a single line in FIG. 5 but optical path B actually spreads to some extent due to a difference in scattering angle.

Figure 5:
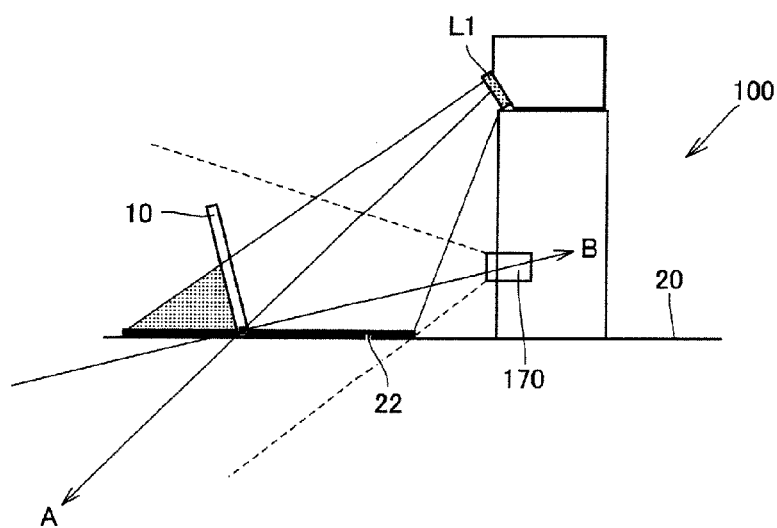
FIG. 5 is an illustration showing an optical path related to position specification of an object on a VUI screen image.

Although object 10 is in contact with VUI screen image 22 in FIG. 5, light-receiving element 170 detects scattered light by object 10 when object 10 is in the vicinity of VUI screen image 22. More specifically, in the description here, "object 10 is placed on VUI screen image 22" includes not only a case where object 10 is in contact with VUI screen image 22 but also a case where object 10 is positioned in the vicinity of VUI screen image 22.

The detection surface of light-receiving element 170 is set between the prescribed lower limit height and upper limit height from the bottom face (the face placed onto desk 20) of projector 100. The lower limit height and the upper limit height are preferably designed such that the scattered light of object 10 positioned on the surface or in the vicinity of the surface of VUI screen image 22 enters the detection surface and that the scattered light of object 10 in a plane separate from VUI screen image 22 enters the detection surface as least as possible. The lower limit height and the upper limit height may be set based on, for example, the positional relation between projector 100 and VUI screen image 22 or the shape of object 10, or by experiment.

Referring to FIG. 6, it will be described that projector 100 determines a contact position of object 10 with VUI screen image 22 based on a detection timing of scattered light. FIG. 6 is a diagram to illustrate determination of a contact position based on a detection timing of scattered light.

The horizontal axes of the three graphs shown in FIG. 6 all represent time. The vertical axes in the three graphs represent an X count, a Y count, and a detection signal (reflection intensity) of light-receiving element 170, respectively from above. In the lower side of FIG. 6, there is also shown a manner of scanning light on VUI screen image 22. It is noted that the resolution of an image is assumed to be 800×600 pixels.

The X count corresponds to the number of times scan mirror 150 moves back and forth in the X direction (horizontal direction). CPU 140 increments the X count at prescribed time intervals corresponding to a laser output frequency. The point where the graph rises in FIG. 6 is the timing at which CPU 140 increments the X count. CPU 140 stores the X count in a memory.

CPU 140 controls the X count and the output position of laser light in connection with each other. More specifically, CPU 140 allows green laser 111 and two-color laser 112 to start outputting laser light at a prescribed frequency at a particular synchronous timing, through laser control circuit 120. Here, the synchronous timing is determined by a photo-detection signal, a piezoelectric signal, a particular position of the vertical driving waveform of mirror controller 150, or the like. CPU 140 starts generation of an X count signal at this synchronous timing. When the X count reaches 800, projection of pixels in the forward path of one line in the horizontal direction is ended. After that, every time the X count increases by 800, projection of pixels in the backward path or the forward path is ended.

The Y count is used to count the number of times scan mirror 150 moves back and forth in the Y direction (horizontal direction). CPU 140 increments the Y count by one every time the X count increases by 800 (the resolution of the horizontal direction). CPU 140 stores the Y count in a memory. When the Y count reaches 600, projection of one frame of an image is ended.

Now, it will be examined that object 10 is in contact with a pixel position (200, 180) in VUI screen image 22. Here, at the point of time when a 180 Y count has elapsed since the start of a frame and then a 200 X count has elapsed, light-receiving element 170 outputs a detection signal corresponding to scattered light by object 10.

CPU 140 obtains a scanning position (the traveling direction of light) at the generation timing of the detection signal, based on a control signal to scan mirror 115 and a projection position calculated based on the detection result of light detection portion 418. CPU 140 determines the position (200, 180), which is a scanning position at the generation timing of the detection signal, as a position where object 10 is in contact.

It is noted that in the present embodiment CPU 140 determines the position of object 10 based on the detection signal that exceeds a prescribed threshold value (position detection threshold value). This is in order to suppress the effect of light other than scattered light incident on light-receiving element 170.

<Marker Display>

Projector 100 in accordance with the present embodiment displays a marker according to the position of object 10 on the projected screen image when detecting object 10 on VUI screen image 22. In particular, in the present embodiment, projector 100 displays a white-colored (the maximum output of the RGB light source) marker. This marker can be used in place of a pointer (for example, equivalent to a mouse pointer in a personal computer) in main projected screen image 32 and additionally to aid light-receiving element 170 to detect scattered light of object 10 reliably.

Therefore, projector 100 can detect a position of object 10 on VUI screen image 22 even when the projected screen image is black or the quantity of each RGB light is too small for light-receiving element 170 to detect. Projector 100 is thus versatile. Moreover, projector 100 is low cost because it does not require any additional special component for displaying a marker.

It is noted that the marker is not limited to the white one as long as it has high luminance to such a degree that light-receiving element 170 can detect scattered light. However, in terms of detection accuracy, most preferably, the marker is white. This is because white light is light with the maximum intensity of each light of RGB and is most easily detected by light-receiving element 170.

Figure 7A:
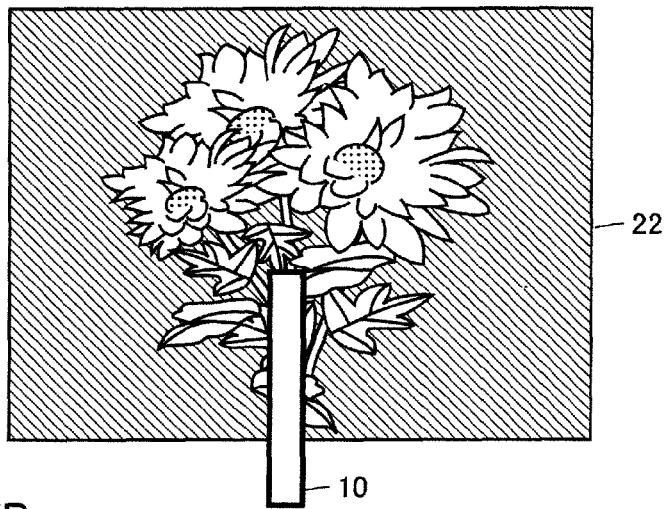
FIG. 7A to FIG. 7C are illustrations showing an example of marker display resulting from input onto the VUI screen image.
Figure 7B:
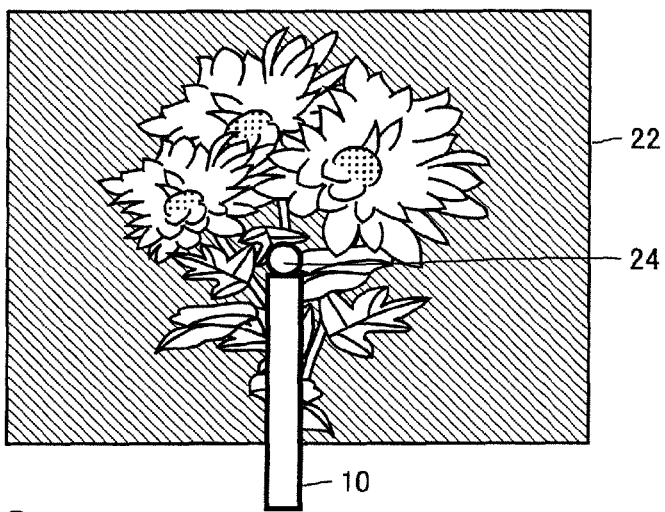
Figure 7C:
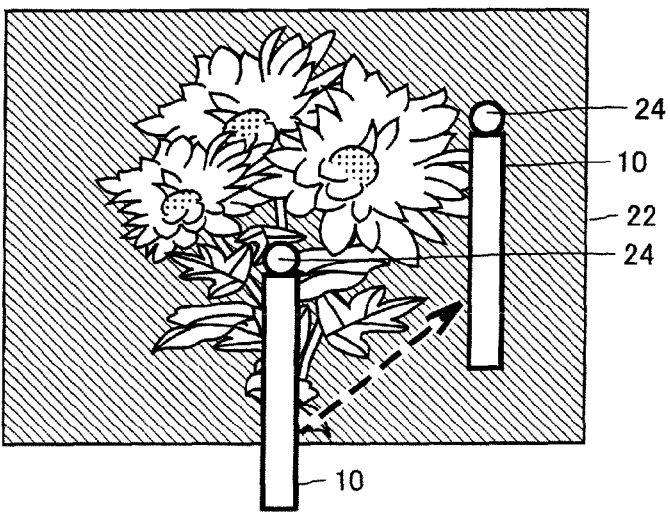

Referring to FIG. 7A to FIG. 7C, the marker displayed by projector 100 will be described.

FIG. 7A shows a state in which object 10 is in contact with (or in proximity to) VUI screen image 22. FIG. 7A shows VUI screen image 22 in which flowers are drawn at the center of a black (shown by hatching in FIG. 7A) background. The lower end (the upper side in FIG. 7A) of object 10 is in a region in which light is projected. FIG. 7B shows VUI screen image 22 after object 10 shown in FIG. 7A coming into contact with VUI screen image 22. Projector 100 detects light scattered by object 10 shown in FIG. 7A. Projector 100 also calculates the position of object 10 based on the detection result. Projector 100 displays a marker 24 at the calculated position.

With reference to FIG. 7C, it will be examined that object 10 moves along VUI screen image 22 from the position shown in FIG. 7B. Projector 100 displays marker 24 including an allowance area at the position of object 10. Therefore, marker 24 moves following object 10. Even when object 10 comes into the black region, reflected light of light for displaying marker 24 enters light-receiving element 170. Therefore, as shown in FIG. 7C, projector 100 can keep displaying marker 24 even when object 10 moves to the black region.

More specifically, if the moving speed of object 10 is smaller than a speed limit determined by the size of marker 24 and the time interval between display position updates of marker 24, projector 100 can move marker 24 such that it follows movement of object 10. The speed limit is a value obtained by dividing the size of marker 24 by the time interval between position updates. As long as the moving speed of object 10 does not exceed the speed limit, object 10 does not get out of the display region of marker 24.

Therefore, in the present embodiment, the size of marker 24 is set larger than the distance of movement of object 10 having the standard moving speed in the time interval between the display position updates of marker 24. Here, "the standard moving speed" varies depending on the usage manner of projector 100. The standard moving speed is set to a predetermined value set appropriately based on experiment results or the like. Alternatively, the user of projector 100 may set the standard moving speed.

It is noted that projector 100 may predict the moving direction of object 10 and move marker 24 based on the prediction result. Specifically, projector 100 calculates the moving direction and the moving speed of object 10 based on the positions of object 10 at two different timings. Projector 100 additionally calculates a predicted position of object 10 at an update time of the marker 24 position, based on the calculated moving direction and moving speed. Projector 100 then displays marker 24 at a region including the predicted position.

When the position of marker 24 is feedfoward-controlled based on movement of object 10 in this manner, the frequency of updating positions of marker 24 may not be increased. Therefore, in accordance with this control, the calculation load on projector 100 is reduced. In addition, this control prevents the displayed marker 24 from frequently moving and prevents the projected screen image from becoming less visible.

However, in the feedfoward control, the display position of marker 24 does not agree well with the position of object 10. In other words, there is a trade-off between the precision of position of marker 24 and the speed of marker 24. The update frequency of marker 24 is preferably set depending on the precision required for display of marker 24.

Projector 100 can display marker 24 even in the black region because of the above-mentioned operation. Projector 100 can keep displaying marker 24 on the projected screen image in response to an input to VUI screen image 22 by utilizing projected light for the marker. Therefore, the user can easily point to a point on the projected screen image using VUI screen image 22.

(Modification)

Projector 100 may provide a high-luminance region at part of the projected screen image when object 10 is not detected, so that projector 100 can display marker 24 more reliably. For example, projector 100 may provide a high-luminance region at part of the projected screen image beforehand at the start of projection of an image. Alternatively, projector 100 may provide a high-luminance region at a prescribed position when object 10 comes into the black region, for example, and is thus not detected. The user first places object 10 in the high-luminance region and then moves object 10 along VUI screen image 22 thereby displaying marker 24 on the projected screen image.

In particular when a predetermined image in which object 10 cannot be detected is projected, projector 100 may provide a high-luminance region at a part of the projected screen image. For example, when all the pixels of image data have low luminance, projector 100 may provide a high-luminance region at a part of the projected screen image. In this case, the user can allow the marker to be displayed even in a screen image that is entirely black.

Such projector 100 can perform position detection even when any screen image such as a black background is projected. Therefore, the versatility of projector 100 is further enhanced.

Now, when the user needs to visually recognize the projected screen image, the high-luminance region is preferably set in a region where visual recognition of the projected screen image is not affected so much (for example, the edge or corner of the projected screen image). Furthermore, projector 100 may reset the initial high-luminance region to the original projected screen image in response to display of marker 24 (or detection of object 10 in any region other than the initial high-luminance region).

Alternatively, projector 100 may display all the positions where object 10 is detected so as to be brightened, rather than moving marker 24 every time object 10 moves. In such projector 100, the user can draw graphics on the projected screen image according to the trail of object 10 by moving object 10 on VUI screen image 22.

In particular, with a combination of this process and the above-noted process of providing a high-luminance region in advance, the user can draw graphics on a black screen image. In other words, projector 100 can function as a kind of handwriting input device.

<Flow of Processing>

Referring to FIG. 8, a flow of processing performed by projector 100 in accordance with the present embodiment will be described.

In step S101, CPU 140 of projector 100 controls green laser 111, two-color laser 112 and scan mirror 115 to project an image based on image data in two directions.

In step S103, CPU 140 determines whether or not light-receiving element 170 detects reflected light by object 10 on VUI screen image 22. Specifically, CPU 140 determines whether or not light-receiving element 170 outputs a detection signal with a prescribed threshold value or higher.

If light-receiving element 170 does not detect reflected light (NO in step S103), CPU 140 repeats the process in step S103. If light-receiving element 170 detects reflected light (NO in step S103), CPU 140 proceeds to the process in step S105.

In step S105, CPU 140 calculates a detected position of object 10 based on the timing at which light-receiving element 170 detects light and the scanning position of laser light (the position to which laser light is directed) at that timing. Furthermore, CPU 140 changes color data of the pixel of image data 472 at the position corresponding to the detected position, to white. In addition, CPU 140 controls laser control circuit 120 to allow the laser of each color to output laser light based on the changed image data.

At this time, CPU 140 stores color data before change into a storage region such as SDRAM 344. This is because CPU 140 needs to reset the changed color data to the original one later.

In step S107, CPU 140 calculates again a detected position of object 10 based on a signal from light-receiving element 170. CPU 140 determines whether or not the detected position has moved, based on the calculated detected position and the previously calculated detected position. Specifically, CPU 140 determines that the detected position has moved when the newly calculated detected position is separated from the previously calculated detected position at a prescribed distance or more.

It is noted that "prescribed distance" referred to herein is preferably set to such a value in that projector 100 does not consider the detection accuracy of the position of object 10 or hand jiggling of the user as movement of the detected position.

In step S109, CPU 140 moves the marker in accordance with the movement of the detected position. More specifically, CPU 140 changes the color data of the pixel at the position corresponding to the newly calculated detected position in step S107, to white. At this time, CPU 140 stores the color data before change into a storage region such as SDRAM 344, similarly to step S105. Furthermore, CPU 140 resets the color data changed in step S105 to the color data before change, based on the color data before change that is stored in the storage region.

Then, after changing the image data as mentioned above, CPU 140 controls laser control circuit 120 to allow the laser of each color to output laser light based on the changed image data.

In step S111, CPU 140 determines whether or not light-receiving element 170 detects again reflected light by object 10. This process of CPU 140 is similar to that of step S103.

If light-receiving element 170 detects reflected light (YES in step S111), CPU 140 repeats the processes from step S107. Therefore, the marker moves following object 10.

If light-receiving element 170 does not detect reflected light (NO in step S111), CPU 140 stops display of the marker in step S113. This is a case where object 10 gets away from VUI screen image 22 or a case where the marker cannot follow object 10.

More specifically, CPU 140 resets the color data changed in step S109 to the color data before change, based on the color data before change that is stored in the storage region, in step S113. After execution of step S113, CPU 140 repeats the processes from step S103.

It is noted that there are various possible timings of stopping display of the marker. For example, CPU 140 may stop display of the marker immediately in response to reflected light becoming undetected. Alternatively, CPU 140 may stop display of the marker when a prescribed time has passed since reflected light became undetected. Alternatively, CPU 140 may leave the marker displayed until object 10 is detected at a position different from the position where the marker is being displayed.

[Second Embodiment]

In the first embodiment, projector 100 for performing marker display reliably has been described. In a second embodiment, projector 100 for ensuring an operation by an icon in a projected screen image will be described.

An "icon" here refers to an image appearing in a prescribed region in a projected screen image for determining an operation instruction. An icon is preferably an image corresponding to an operation to change a screen image, such as paging. The user can operate projector 100 intuitively by performing an operation while looking at the icon on VUI screen image 22.

The hardware configuration and functional configuration of projector 100 in accordance with the second embodiment is similar to that of the first embodiment and therefore a detailed description thereof will not be repeated.

Projector 100 in accordance with the second embodiment generates a white region in an icon display region or in a region surrounding the icon display region. Therefore, projector 100 can reliably detect an operation on an icon on VUI screen image 22 without depending on the original projected screen image. The region generated by projector 100 is preferably white but is not limited to white as long as it has high luminance, similarly to the first embodiment. In the following, specific examples of projected screen images in the present embodiment will be described.

Figure 9:
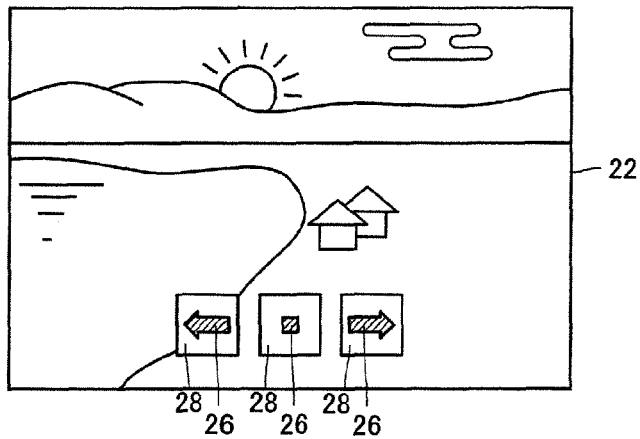
FIG. 9 is an illustration showing a first example of the VUI screen image in accordance with a second embodiment.

FIG. 9 shows a first example of VUI screen image 22 in accordance with the second embodiment. Referring to FIG. 9, VUI screen image 22 includes three icons 26 (shown by hatching in the figure) and rectangular white regions 28 arranged to surround icons 26.

Icons 26 shown here correspond to trick play (fast-forward, rewind, stop, etc.). The operations corresponding to icons 26, however, are not limited thereto. The display manner of icons 26 is also not limited to the one shown in FIG. 9.

In the present embodiment, projector 100 does not always display icons 26 but displays icons 26 in response to a prescribed instruction. For example, projector 100 displays icons 26 on the projected screen image in response to detection of object 10 in a prescribed region in VUI screen image 22 (for example, the edge or corner of VUI screen image 22).

Projector 100 displays white region 28 as shown in FIG. 9 by setting to white color data of pixels in a prescribed region (excluding the display region of icon 26) around the display region of each icon 26. It is noted that the display region of icon 26 is designated by image data 472. Projector 100 reads out the display region of icon 26 from image data 472 and determines white region 28 based on the read display region of icon 26.

Alternatively, projector 100 may create icon 26 and white region 28 at a prescribed position based on program 474. In this case, projector 100 simply invokes the display region of icon 26 and white region 28 from storage portion 470 and overlays icon 26 and white region 28 onto the original image data.

When the user places object 10 around the periphery of icon 26, projector 100 can detect object 10 based on reflected light of light applied to white region 28 even when icon 26 has low luminance or has a color that is difficult for light-receiving element 170 to detect. Therefore, projector 100 can reliably perform an operation based on an icon operation through VUI screen image 22. Furthermore, white region 28 has an effect of making icon 26 easily viewable in a projected image.

Figure 10:
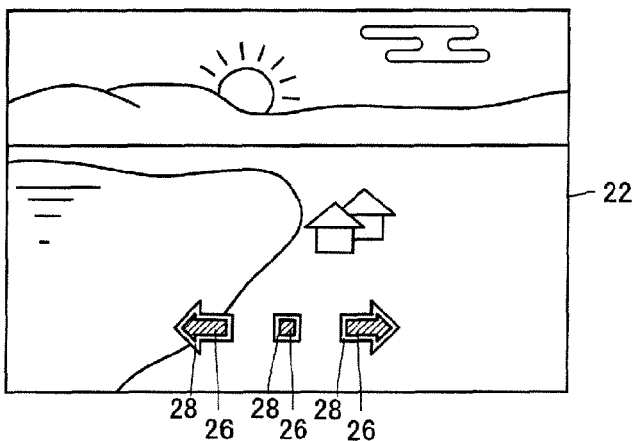
FIG. 10 is an illustration showing a second example of the VUI screen image in accordance with the second embodiment.

The shape and arrangement of white region 28 is not limited to that shown in FIG. 9. FIG. 10 shows a second example of VUI screen image 22 in accordance with the second embodiment. In VUI screen image 22 shown in FIG. 10, white region 28 is arranged to fringe icon 26.

Projector 100 displays white region 28 in such a manner, by setting to white color data of pixels within a prescribed distance from the display region of each icon 26 in an external region to the display region of each icon 26. Alternatively, the display regions of icon 26 and white region 28 may be stored in advance in projector 100.

Figure 11:
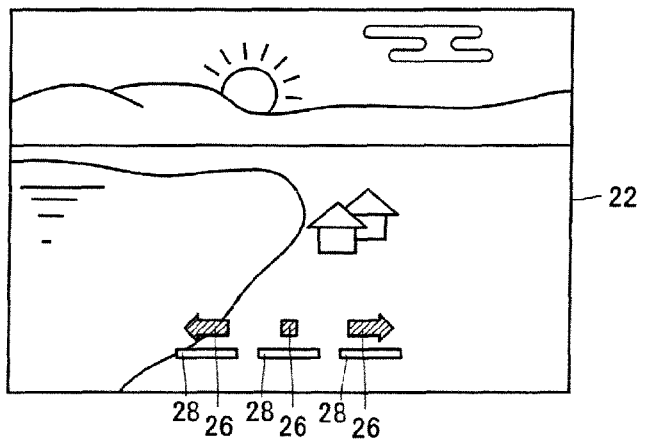
FIG. 11 is an illustration showing a third example of the VUI screen image in accordance with the second embodiment.

FIG. 11 shows a third example of VUI screen image 22 in accordance with the second embodiment. In VUI screen image 22 shown in FIG. 11, white region 28 in the form of an auxiliary line is arranged below icon 26.

As described in the first example and the second example, projector 100 determines white region 28 based on the display region of each icon 26. Alternatively, projector 100 determines white region 28 based on a designated range stored in projector 100 in advance.

It is noted that the display position of the white region for assisting selection of icon 26 is not limited to those shown in FIG. 9 to FIG. 11 as long as the white region is provided around the periphery of the display region of the icon. Alternatively, projector 100 may set icon 26 itself in white.

Figure 12:
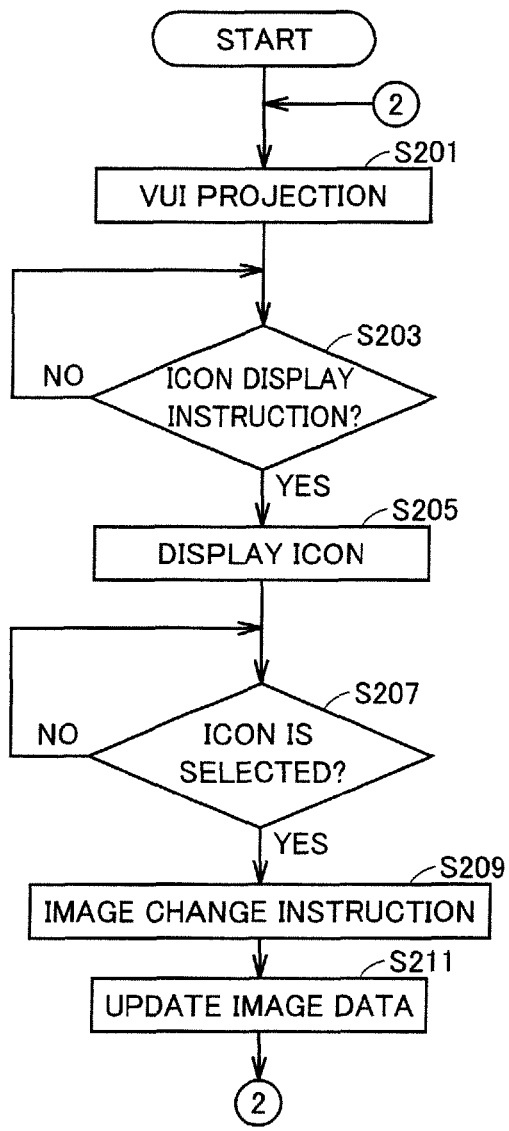
FIG. 12 is a flowchart showing a flow of processing performed by the projector in accordance with the second embodiment.

Referring to FIG. 12, a flow of processing performed by projector 100 in accordance with the second embodiment will be described.

In step S201, CPU 140 of projector 100 controls green laser 111, two-color laser 112 and scan mirror 115 to project an image based on image data in two directions.

In step S203, CPU 140 determines whether or not an icon display instruction is given. The instruction to display an icon includes detection of object 10 in a prescribed region of VUI screen image 22. In the present embodiment, CPU 140 determines that the icon display instruction is given until an icon display end instruction is accepted since an icon display start instruction was accepted.

If an icon display instruction is not given (NO in step S203), CPU 140 repeats the process in step S203. If an icon display instruction is given (YES in step S203), CPU 140 proceeds to the process in step S205.

In step S205, CPU 140 adds data for displaying an icon to image data 472. Here, CPU 140 sets to white color data in the display region of the icon or in a region surrounding the display region of the icon. CPU 140 controls green laser 111, two-color laser 112 and scan mirror 115 to project an image based on the changed image data 472 in two directions.

In step S207, CPU 140 determines whether the icon in VUI screen image 22 is selected or not. Specifically, CPU 140 determines whether the icon is selected or not by comparing data representing the display region of the icon with the position of object 10 calculated based on the light reception result of light-receiving element 170.

If the icon is not selected (NO in step S207), CPU 140 repeats the process in step S207. If the icon is selected (YES in step S207), CPU 140 proceeds to the process in step S209.

In step S209, CPU 140 generates an image change instruction corresponding to the selected icon. When an icon for trick play is displayed, CPU 140 generates an image fast-forward instruction, an image rewind instruction, an instruction to stop the image in process, or the like.

In step S211, CPU 140 updates image data 472 based on the image change instruction generated in step S209. CPU 140 thereafter repeats the processes from step S201.

[Third Embodiment]
<Overview>

Projector 100 in accordance with the second embodiment generates image data 472 by CPU 140 (or image processing portion 495) in projector 100. More specifically, projector 100 can generate image data 472 by executing program 474 stored in projector 100.

In the second embodiment, projector 100 can generate image data 472 for projection, based on image data accepted from the outside. Therefore, for example, projector 100 can display a slideshow of a plurality of image files in a storage medium (such as an SD or a flash memory) attached to projector 100, in accordance with a prescribed instruction to the VUI screen image.

In contrast, projector 100# in accordance with a third embodiment does not generate image data 472 by itself. Projector 100# is used such that it is connected with external electronic equipment 1000. Projector 100# instructs electronic equipment 1000 to change image data 472 that is transmitted to projector 100# by electronic equipment 1000, in accordance with a VUI screen operation. In other words, in the third embodiment, electronic equipment 1000 plays a main role in changing the display screen image according to the VUI screen operation.

Figure 13:
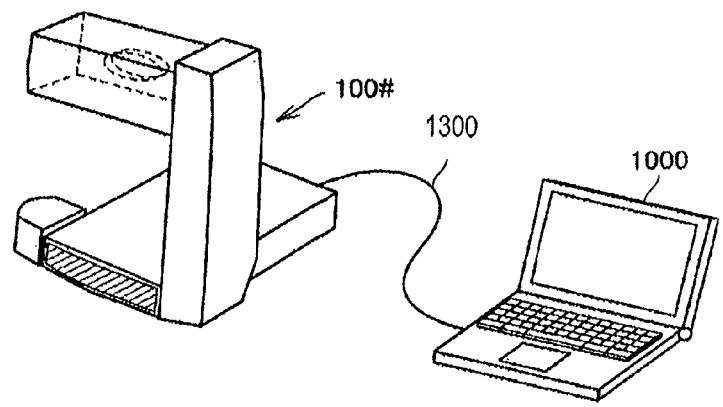
FIG. 13 is an illustration representing a usage manner of a projector in accordance with a third embodiment.

FIG. 13 shows a usage manner of projector 100# in accordance with the third embodiment.

Referring to FIG. 13, projector 100# is connected to external electronic equipment 1000 through a cable 1300. Projector 100# may be connected to electronic equipment 1000 by anything other than cable 1300. Projector 100# may be wirelessly connected to electronic equipment 1000.

Here, electronic equipment 1000 is a notebook computer as illustrated in FIG. 13. However, electronic equipment 1000 is not limited to a notebook computer as long as electronic equipment 1000 is connectable to projector 100# and can perform the operation described below.

Projector 100# is installed, for example, on desk 20, similarly to projector 100 in accordance with the first or second embodiment. Projector 100# projects a main projected screen image on a first projection surface such as wall 30. Projector 100# also projects a VUI screen image on a second projection surface such as desk 20. It is noted that desk 20 and wall 30 are not shown in FIG. 13.

<Hardware Configuration>

(Projector 100#)

A hardware configuration of projector 100# is similar to that of projector 100 in accordance with the first or second embodiment. Therefore, a detailed description will not be repeated here for all of the hardware configuration. However, external interface 343 (see FIG. 3) concerning connection with electronic equipment 1000 will be described in detail below.

Projector 100# is connected to electronic equipment 1000 through external interface 343. External interface 343 receives image data from electronic equipment 1000. External interface 343 applies the image data received from external equipment 1000 to CPU 140.

External interface 343 in the present embodiment may be, for example, an external connection terminal such as a USB (Universal Serial Bus) connector or a LAN (Local Area Network) connector. Alternatively, external interface 343 may be a radio transmitter/receiver wirelessly communicating with electronic equipment 1000.

(Electronic Equipment 1000)

Figure 14:
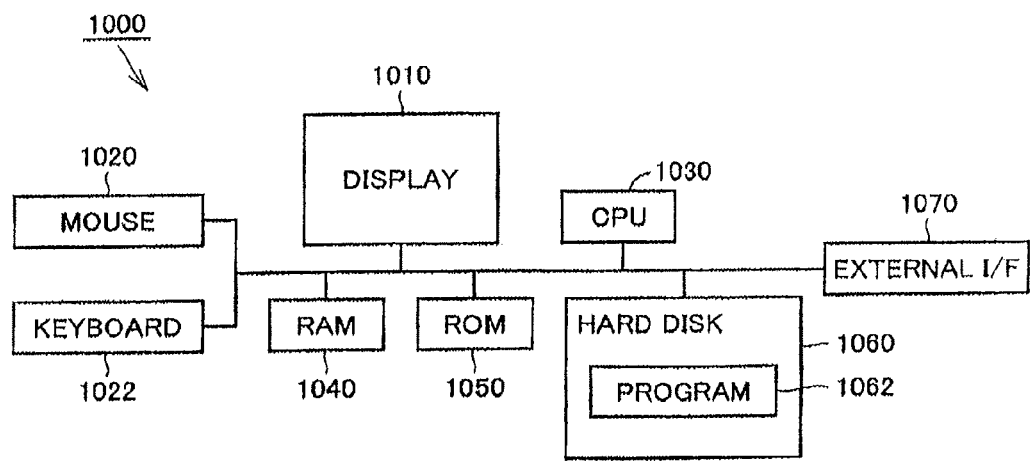
FIG. 14 is a block diagram showing a hardware configuration of electronic equipment.

With reference to FIG. 14, a hardware configuration of electronic equipment 1000 will be described. Electronic equipment 1000 includes a display 1010, a keyboard 1022, a CPU 1030, a RAM 1040, an ROM (Read-Only Memory) 1050, a hard disk 1060, and an external interface 1070.

Display 1010 displays an image based on data in electronic equipment 1000. A mouse 1020 and keyboard 1022 accept an external input operation. Mouse 1020 and keyboard 1022 are examples of input device. Electronic equipment 1000 may have any other input device such as a tablet.

CPU 1030 controls the operation of electronic equipment 1000 based on an instruction accepted by mouse 1020 or keyboard 1022. Specifically, CPU 1030 executes a program and gives an operation instruction to each unit of electronic equipment 1000.

RAM 1040 temporarily stores data. RAM 1040 is used as a working memory at a time of program execution. ROM 1050 stores data for a long time. Hard disk 1060 is a storage device capable of reading and writing data. Hard disk 1060 stores a program 1062 and the like. It is noted that hard disk 1060 is an example of the storage device capable of reading and writing data. Electronic equipment 1000 may additionally have a storage device such as a flash memory in place of or in addition to hard disk 1060.

Program 1062 is executed by CPU 1030 to generate image data. Program 1062 is, for example, presentation software. Although FIG. 14 shows only one program 1062, the storage device such as hard disk 1060 may store a plurality of programs 1062.

External interface 1070 connects electronic equipment 1000 with projector 100#. External interface 1070 is, for example, a USB connector or a LAN connector. Alternatively, external interface 1070 may be a radio transmitter/receiver.

<Functional Configuration>

Figure 15:
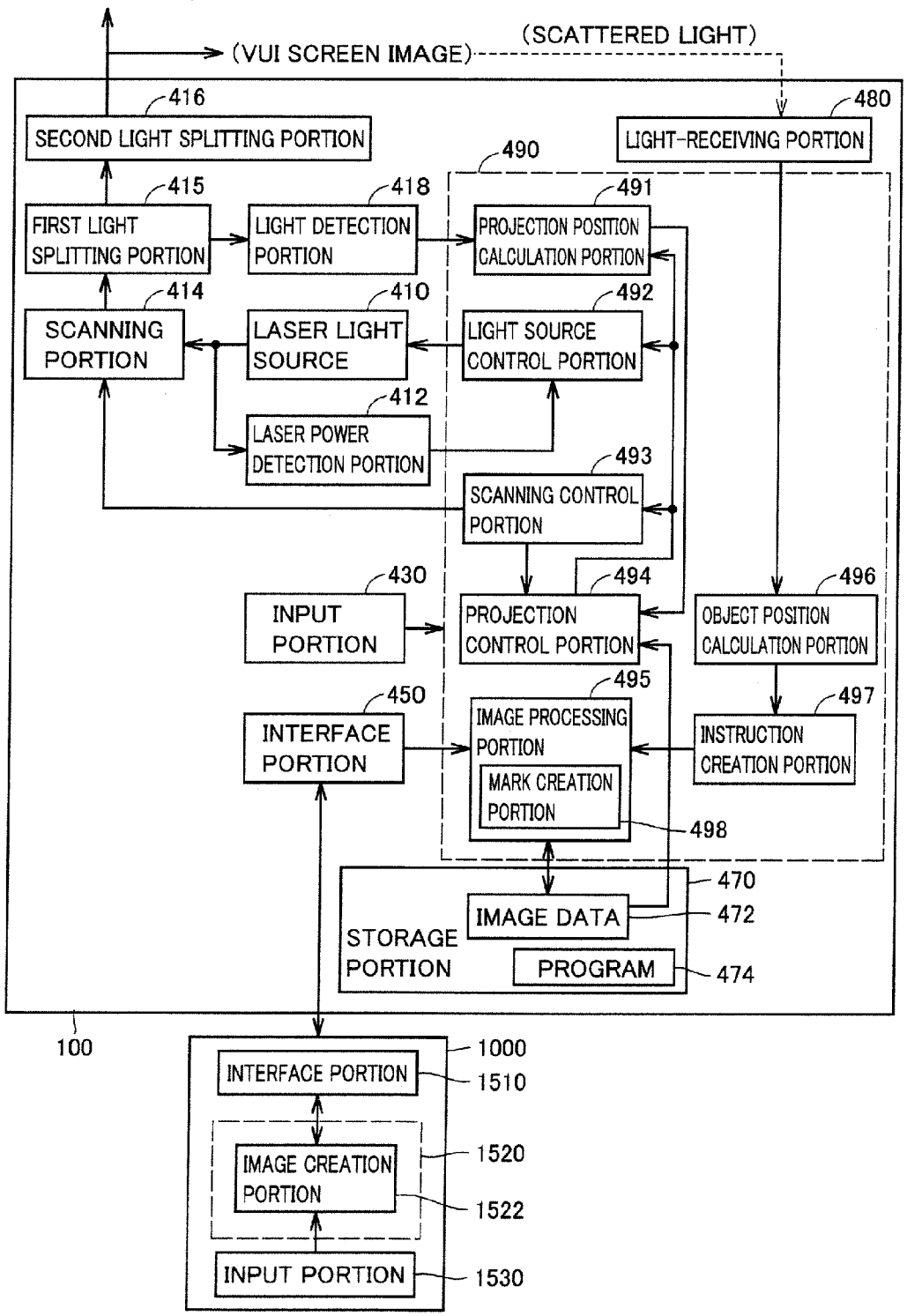
FIG. 15 is a diagram showing a functional configuration of a projector system.

Referring to FIG. 15, a functional configuration of a system (projector system) including projector 100# and electronic equipment 1000 will be described.

(Electronic Equipment)

First, the functional configuration of electronic equipment 1000 will be described. Referring to FIG. 15, electronic equipment 1000 includes an interface portion 1510, a control portion 1520, and an input portion 1530.

Interface portion 1510 exchanges data with projector 100#. For example, interface portion 1510 receives an operation instruction from projector 100#. Furthermore, interface portion 1510 transmits image data to projector 100#. External interface 1070 corresponds to interface portion 1510.

Control portion 1520 controls the operation of each unit of electronic equipment 1000. CPU 1030 corresponds to control portion 1520. Control portion 1520 includes an image creation portion 1522. Image creation portion 1522 generates image data based on an instruction. Control portion 1520 controls interface portion 1510 to transmit the generated image data to projector 100#.

Input portion 1530 accepts an external instruction. Mouse 1020 and keyboard 1022 correspond to input portion 1530.

(Projector)

The functional configuration of projector 100# is generally similar to the functional configuration of projector 100 in accordance with the first embodiment. In the following, the difference from the first embodiment will be described.

Electronic equipment 1000 transmits new image data to projector 100# based on an image data change instruction. Projector 100# overwrites image data 472 in storage portion 470 with new image data from electronic equipment 1000.

Instruction creation portion 497 of projector 100# creates an instruction to change the image data transmitted to projector 100# by electronic equipment 1000, based on the object position data received from object position calculation portion 496. Instruction creation portion 497 controls interface portion 450 to send the change instruction to electronic equipment 1000.

Interface portion 450 receives data transmitted to projector 100# by electronic equipment 1000 in response to the change instruction. Interface portion 450 then stores the data received by projector 100# into a storage region as image data 472.

Display control portion 444 controls the operations of light source control portion 492 and scanning control portion 493 based on new image data 472 generated by electronic equipment 1000 in response to the change instruction. Specifically, for example, display control portion 444 reads image data 472 from storage portion 470 at prescribed time intervals or in response to an operation instruction by instruction creation portion 497. Display control portion 444 then controls the operations of light source control portion 492 and scanning control portion 493 based on the read image data 472.

In the present embodiment, image processing portion 495 is not necessarily required. Image processing portion 495 is not necessary if image creation portion 1422 of electronic equipment 1000 performs a screen image change in accordance with a VUI screen operation.

In the present embodiment, the user can operate application software executed by electronic equipment 1000 through the VUI screen image. Projector 100# need not store, for example, a program for generating icons on a projected screen image.

<Flow of Processing>

Figure 16:
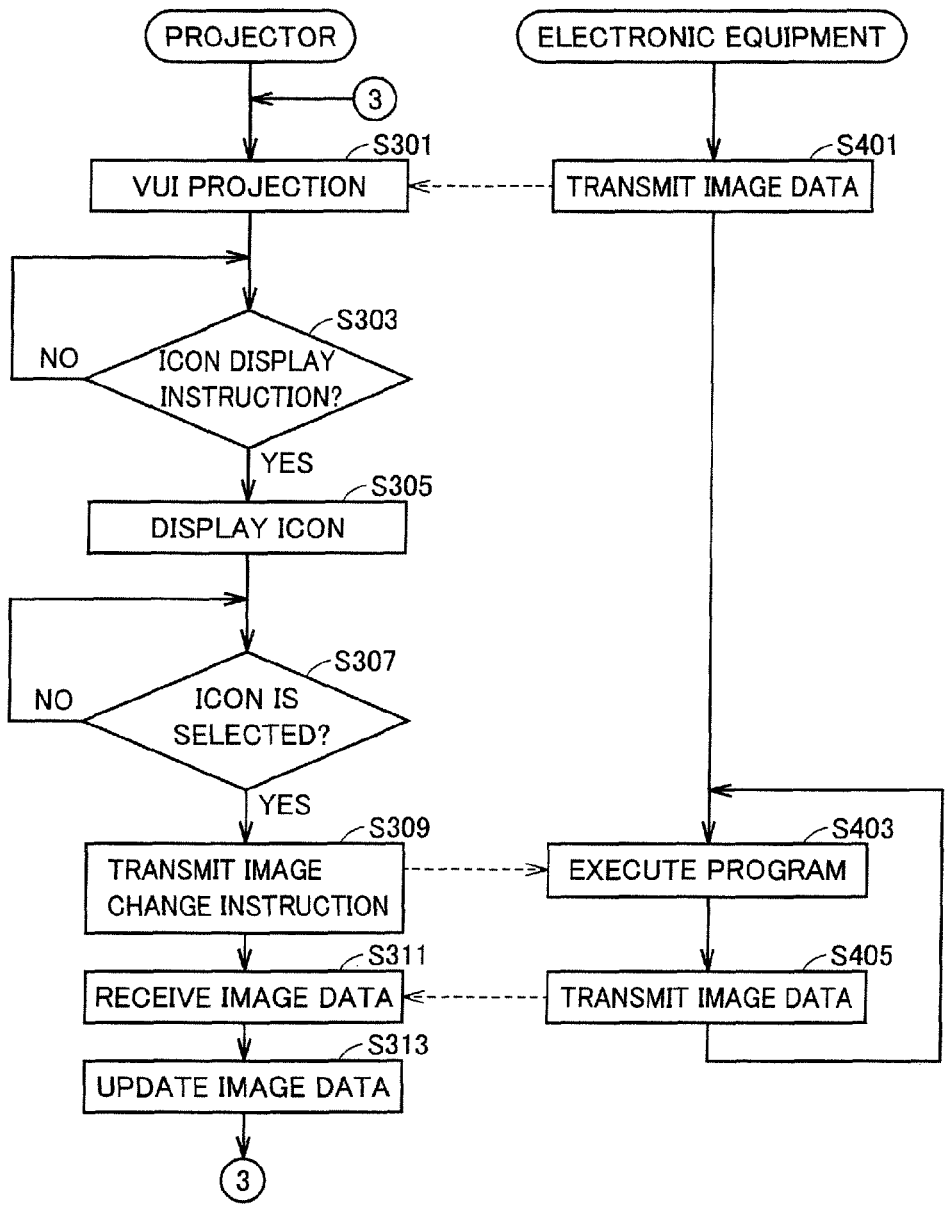
FIG. 16 is a sequence diagram showing a flow of processing performed by the projector system.

Referring to FIG. 16, processing performed by the projector system will be described.

First, the operation of projector 100# will be described. In step S301, CPU 140 of projector 100# controls green laser 111, two-color laser 112 and scan mirror 115 to project an image based on image data from electronic equipment 1000 in two directions.

The processes by CPU 140 from step S303 to step S307 are similar to the processes from step S203 to step S207 in FIG. 12, and a description thereof will not be repeated.

In step S309, CPU 140 controls external interface 343 to transmit an operation instruction for image change to electronic equipment 1000.

In step S311, CPU 140 receives image data from electronic equipment 1000 through external interface 343.

In step S313, CPU 140 replaces image data 472 stored in storage portion 470 with the image data received in step S313.

The operation of electronic equipment 1000 will now be described. In step S401, CPU 1030 of electronic equipment 1000 controls external interface 1070 to transmit image data to projector 100#. For example, electronic equipment 1000 transmits image data corresponding to an image appearing on display 1010, to projector 100#.

In step S403, CPU 1030 executes a program for generating image data based on the operation instruction from projector 100#. The program referred to herein is, for example, presentation software.

In step S405, CPU 1030 controls external interface 1070 to transmit the image data generated as a result of execution of the program to projector 100#. CPU 1030 thereafter repeats the processes from step S403.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display apparatus for emitting laser light, displaying a first image on a first projection surface, and displaying a second image on a second projection surface comprising:
   a laser light source for outputting said laser light;
   a scanner for scanning said laser light;
   a light splitting element for splitting said laser light scanned by said scanner into a first laser beam directed to said first projection surface and a second laser beam directed to said second projection surface;
   a photodetector for detecting said second laser beam reflected by an external object on said second projection surface; and
   a controller for controlling an operation of said image display apparatus, said controller being configured:
   to allow said scanner to operate at a prescribed scanning frequency,
   to execute processing of accepting image data and increasing luminance of a pixel in a designated region included in accepted said image data,
   to control output of said laser light by said laser light source based on said image data subjected to said processing and said scanning frequency,
   to calculate a position of said external object based on a scanning position of said laser light at a light detection timing of said photodetector, and
   to create an instruction to change said second image based on calculated said position,
   wherein said controller is configured to define a region including calculated said position as said designated region, and a size of said designated region is larger than a distance of movement of said object in a time interval between changes of said second image.

2. The image display apparatus according to claim 1, wherein said controller is configured to set said pixel in said designated region to white.

3. The image display apparatus according to claim 1, wherein said controller is configured to increase luminance of said pixel in a prescribed region when said position is not calculated.

4. The image display apparatus according to claim 1, wherein said controller is configured to create said instruction when calculated said position is in said designated region.

5. The image display apparatus according to claim 4, wherein said designated region is an icon display region or a region surrounding said icon display region.

6. An image display apparatus for emitting laser light, displaying a first image on a first projection surface, and display a second image on a second projection surface comprising:
   a laser light source for outputting said laser light;
   a scanner for scanning said laser light;
   a light splitting element for splitting said laser light scanned by said scanner into a first laser beam directed to said first projection surface and a second laser beam directed to said second projection surface;
   a photodetector for detecting said second laser beam reflected by an external object on said second projection surface; and
   a controller for controlling an operation of said image display apparatus, said controller being configured;
   to allow said scanner to operate at a prescribed scanning frequency,
   to execute processing of accepting image data and increasing luminance of a pixel in a designated region included in accepted said image data,
   to control output of said laser light by said laser light source based on said image data subjected to said processing and said scanning frequency,
   to calculate a position of said external object based on a scanning position of said laser light at a light detection timing of said photodetector, and
   to create an instruction to change said second image based on calculated said position, wherein said controller is configured to define a region including calculated said position as said designated region, and to calculate a predicted position of said object based on a change of said position and a time interval between changes of said second image and define a region including said predicted position as said designated region.

7. An image display apparatus for emitting laser light, displaying a first image on a first projection surface, and displaying a second image on a second projection surface comprising:
   a laser light source for outputting said laser light,
   said laser light source including
      a two-color laser for outputting red laser light and blue laser light, and
      a green laser for outputting green laser light;
   a resonant MEMS mirror for scanning said laser light;
   a beam splitter for splitting said laser light scanned by said resonant MEMS mirror into a first laser beam directed to said first projection surface and a second laser beam directed to said second projection surface;
   a photodiode for detecting said second laser beam reflected by an external object on said second projection surface; and
   a controller for controlling an operation of said image display apparatus, said controller being configured:
   to allow said resonant MEMS mirror to operate at a prescribed scanning frequency, to execute processing of accepting image data and setting to white a pixel in a designated region included in accepted said image data, to control output of said laser light by said laser light source based on said image data subjected to said processing and said scanning frequency, to calculate a position of said external object based on a scanning position of said laser light at a light detection timing of said photodiode, to create an instruction to change said second image based on calculated said position, and to set a region including calculated said position as said designated region, wherein a size of said designated region is larger than a distance of movement of said object in a time interval between changes of said second image.

8. A method for emitting laser light, displaying a first image on a first projection surface, and displaying a second image on a second projection surface, using an image display apparatus, said image display apparatus having:
a laser light source for outputting said laser light,
a scanner for scanning said laser light,
a light splitting element for splitting said laser light scanned by said scanner into a first laser beam directed to said first projection surface and a second laser beam directed to said second projection surface, and
a photodetector for detecting said second laser beam reflected by an external object on said second projection surface, said method comprising:
executing processing of accepting image data and increasing luminance of a pixel in a designated region included in accepted said image data;
allowing said scanner to operate at a prescribed scanning frequency and controlling output of said laser light by said laser light source based on said image data subjected to said processing and said scanning frequency;
calculating a position of said external object based on a scanning position of said laser light at a light detection timing of said photodetector; and
changing said second image based on calculated said position,
defining a region including calculated said position as said designated region, wherein a size of said designated region is larger than a distance of movement of said object in a time interval between changes of said second image.

9. A non-transitory recording medium having a program stored therein for allowing an image display apparatus to emit laser light, display a first image on a first projection surface, and display a second image on a second projection surface, said image display apparatus having:
a laser light source for outputting said laser light,
a scanner for scanning said laser light,
a light splitting element for splitting said laser light scanned by said scanner into a first laser beam directed to said first projection surface and a second laser beam directed to said second projection surface, and
a photodetector for detecting said second laser beam reflected by an external object on said second projection surface, when said program is read out, said program causing a computer to execute:
executing processing of increasing luminance of a pixel in a designated region included in image data applied to said computer;
allowing said scanner to operate at a prescribed scanning frequency and controlling output of said laser light by said laser light source based on said image data subjected to said processing and said scanning frequency;
calculating a position of said external object based on a scanning position of said laser light at a light detection timing of said photodetector; and
changing said second image based on calculated said position,
defining a region including calculated said position as said designated region, wherein a size of said designated region is larger than a distance of movement of said object in a time interval between changes of said second image.

* * * * *